US012687630B2

(12) United States Patent (10) Patent No.: US 12,687,630 B2

Tateishi (45) Date of Patent: Jul. 21, 2026

(54) DETECTION DEVICE, IMAGE FORMING APPARATUS, NON-TRANSITORY COMPUTER READABLE MEDIUM, AND DETECTION METHOD

(71) Applicant: FUJIFILM Business Innovation Corp., Tokyo (JP)

(72) Inventor: Naohiro Tateishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/163,020

(22) Filed: Feb. 1, 2023

(65) Prior Publication Data

US 2024/0085556 A1 Mar. 14, 2024

(51) Int. Cl.

| *H04N 1/04* | (2006.01) |
| *G01S 15/42* | (2006.01) |
| *G01S 15/58* | (2006.01) |
| *H04N 1/00* | (2006.01) |

(52) U.S. Cl.

CPC ............ *G01S 15/42* (2013.01); *G01S 15/586* (2013.01); *H04N 1/00729* (2013.01); *H04N 1/00779* (2013.01)

(58) Field of Classification Search

USPC ................................. 356/5.01; 358/401, 501

See application file for complete search history.

(56) References Cited

U.S. PATENT DOCUMENTS

| 10,298,796 | B2 | 5/2019 | Yokoyama et al. | |
| 2017/0272946 | A1* | 9/2017 | Watanabe | H04L 63/0492 |
| 2018/0031684 | A1* | 2/2018 | Horishita | H04N 1/00896 |
| 2018/0032013 | A1* | 2/2018 | Fukushima | H04N 1/00323 |
| 2018/0034995 | A1 | 2/2018 | Yokoyama et al. | |
| 2018/0041655 | A1* | 2/2018 | Nakajima | G06F 1/3231 |
| 2018/0203651 | A1* | 7/2018 | Fukushima | G01S 15/88 |
| 2018/0284671 | A1* | 10/2018 | Fuse | G03G 15/5004 |
| 2019/0235603 | A1* | 8/2019 | Murata | G01J 5/047 |
| 2023/0057219 | A1* | 2/2023 | Ogata | H04N 1/00087 |

FOREIGN PATENT DOCUMENTS

JP 2018-019361 A 2/2018

* cited by examiner

*Primary Examiner* — Cheukfan Lee

(74) *Attorney, Agent, or Firm* — Oliff PLC

(57) ABSTRACT

A detection device includes: a sound wave sensor that detects a distance to a measurement target; and a processor configured to: in response to the measurement target being detected in a first detection range that is part of a detection range in which the distance to the measurement target is detectable by the sound wave sensor, change setting to cause a detection sensitivity for a second detection range in the detection range of the sound wave sensor to be a second detection sensitivity lower than a first detection sensitivity set before the setting is changed, the second detection range being outward of the first detection range when viewed from the detection device.

14 Claims, 26 Drawing Sheets

DETECTION DEVICE, IMAGE FORMING APPARATUS, NON-TRANSITORY COMPUTER READABLE MEDIUM, AND DETECTION METHOD

CROSS-REFERENCE TO RELATED APPLICATIONS

This application is based on and claims priority under 35 USC 119 from Japanese Patent Application No. 2022-146417 filed Sep. 14, 2022.

BACKGROUND

(i) Technical Field

The present disclosure relates to a detection device, an image forming apparatus, a non-transitory computer readable medium, and a detection method.

(ii) Related Art

Japanese Unexamined Patent Application Publication No. 2018-019361 describes an apparatus that detects a person by using a sound wave sensor and that prevents wrong detection by an ultrasonic wave sensor even in such an environment that involves with external noise occurrence causing the wrong detection or a temperature difference in the detection area.

SUMMARY

For example, to save energy, the operation state of an electronic apparatus is controlled in such a manner that a detection device including a sound wave sensor is installed in an electronic apparatus and a measurement target such as a person approaching the electronic apparatus is detected.

The detection device including the sound wave sensor has a wider detection range than that of, for example, a detection device including a reflection optical sensor and thus is capable of controlling the operation state of the electronic apparatus at an earlier stage. Nevertheless, the wider detection range has a higher possibility of detection of multiple measurement targets in the detection range.

The detection device including the sound wave sensor has the wider detection range than that of, for example, the detection device including the reflection optical sensor and thus is capable of controlling the operation state of the electronic apparatus at an earlier stage. Nevertheless, if there are multiple measurement targets are present in the detection range, the wider detection range possibly causes detection of even a measurement target having a lower possibility of influencing the control of the operation state of the electronic apparatus.

Aspects of non-limiting embodiments of the present disclosure relate to a detection device enabled to prevent the number of measurement targets from being increased even in a wider detection range than in a case where the number of detected measurement targets is increased in proportion to the detection range, and also relates to an image forming apparatus including the detection device, a non-transitory computer readable medium, and a detection method.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a detection device including: a sound wave sensor that detects a distance to a measurement target; and a processor configured to: in response to the measurement target being detected in a first detection range that is part of a detection range in which the distance to the measurement target is detectable by the sound wave sensor, change setting to cause a detection sensitivity for a second detection range in the detection range of the sound wave sensor to be a second detection sensitivity lower than a first detection sensitivity set before the setting is changed, the second detection range being outward of the first detection range when viewed from the detection device.

BRIEF DESCRIPTION OF THE DRAWINGS

An exemplary embodiment of the present disclosure will be described in detail based on the following figures, wherein.

DETAILED DESCRIPTION

Figure 1:
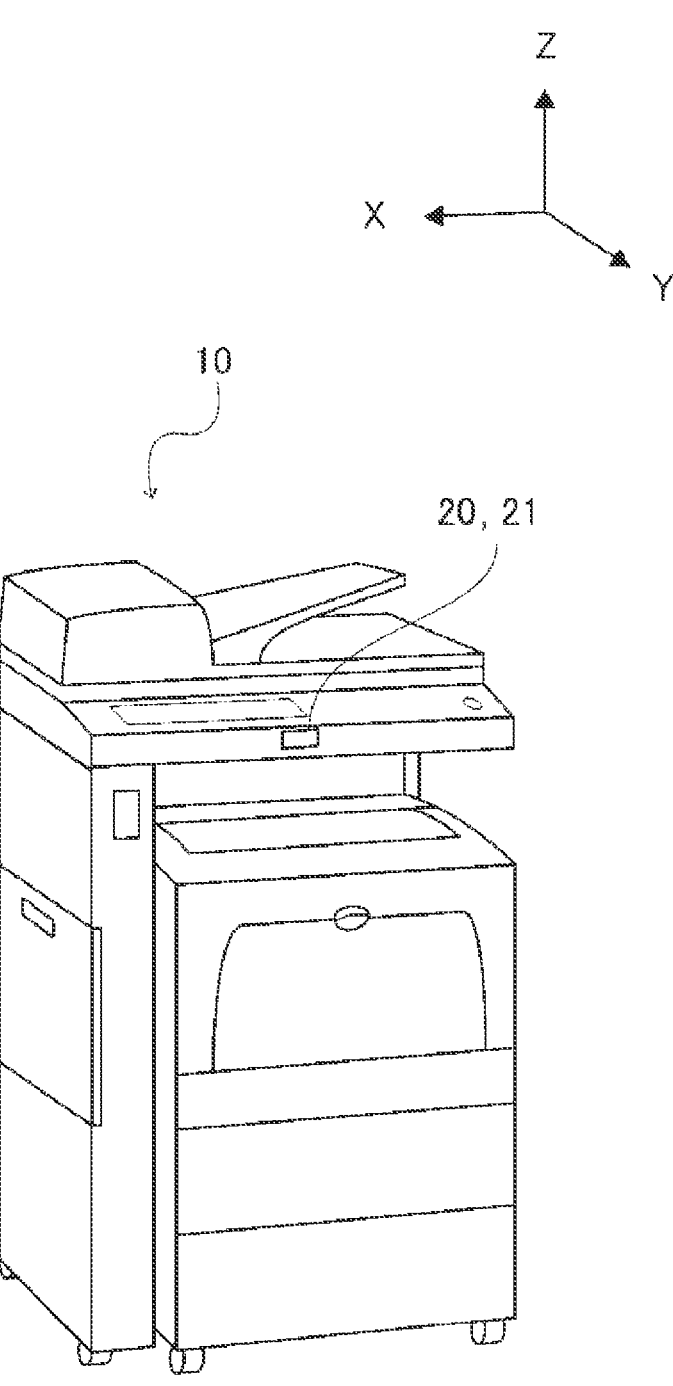
FIG. 1 is an appearance view for explaining the schematic configuration of an image forming apparatus of this exemplary embodiment.

Hereinafter, an exemplary embodiment of the present disclosure will be described in detail with reference to the drawings. FIG. 1 is an appearance view for explaining the schematic configuration of an image forming apparatus 10 of this exemplary embodiment. An X axis, a Y axis, and a Z axis in FIG. 1 represent respective coordinate axes of the image forming apparatus 10. The X axis direction is a horizontal direction and represents a width direction of the apparatus. The Y axis direction is a horizontal direction and represents a depth direction of the apparatus. The Z axis direction is a perpendicular direction and represents a length direction of the apparatus.

As illustrated in FIG. 1, the image forming apparatus 10 is what is called a multifunctional printer having multiple functions such as a printing function, a scanning function, a copying function, and a faxing function.

The image forming apparatus 10 includes a detection device 20 that detects a user who uses the image forming apparatus 10. The image forming apparatus 10 has, on its front face, an ultrasonic wave sensor 21 as a human sensor included in the detection device 20. Typically, a user approaches the location where the image forming apparatus 10 is installed, and thus the ultrasonic wave sensor 21 included in the detection device 20 is set to detect such a user. The ultrasonic wave sensor 21 is an example of a sound wave sensor of the technology of the present disclosure.

In the image forming apparatus 10 of this exemplary embodiment, a user who uses the image forming apparatus 10 is detected by using, for example, the detection device 20, and thus such operation state control that causes the image forming apparatus 10 to return from an energy-saving state to a normal operation state is performed.

Figure 2:
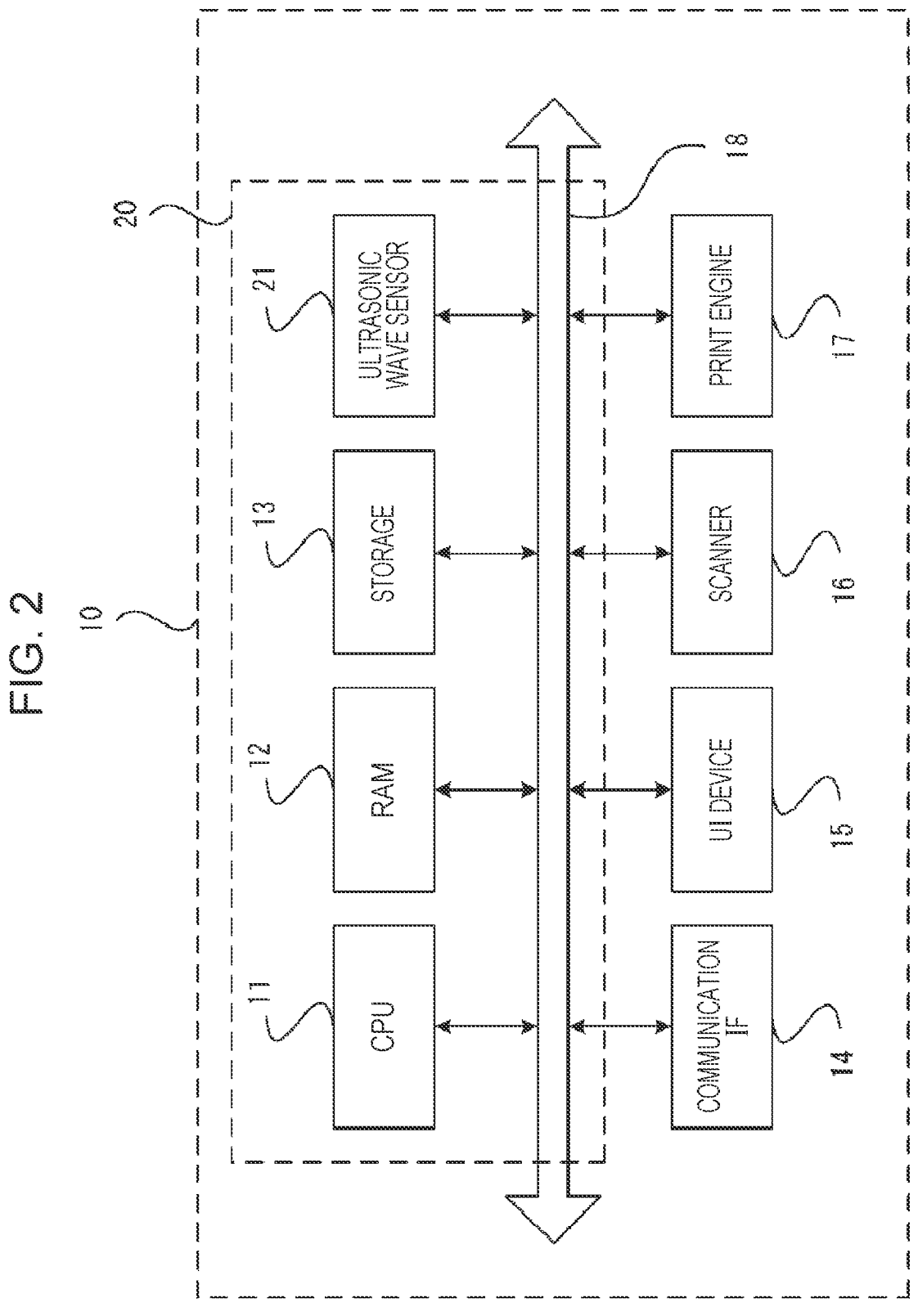
FIG. 2 is a block diagram illustrating the hardware configuration of the image forming apparatus and a detection device.

The hardware configuration of the image forming apparatus 10 and the detection device 20 of this exemplary embodiment will then be described. FIG. 2 is a block diagram illustrating the hardware configuration of the image forming apparatus 10 and the detection device 20.

The image forming apparatus 10 includes the detection device 20 and, as illustrated in FIG. 2, has a central processing unit (CPU) 11, a random access memory (RAM) 12, a storage 13 such as a hard disk drive, a communication interface (abbreviated as IF) 14, a user interface (abbreviated as UI) device 15 including a touch panel or a liquid crystal display as well as a keyboard, a scanner 16, a print engine 17, and the ultrasonic wave sensor 21. These components are connected to each other with a control bus 18 interposed therebetween.

The communication IF 14 transmits and receives data to and from an external apparatus or the like. The UI device 15 receives instruction input from the user. The scanner 16 reads, as image data, a document placed on the image forming apparatus 10. The print engine 17 prints the image on the recording medium such as a printing sheet after processes such as charging, light exposure, development, transfer, and fixing.

The CPU 11 is a processor that controls the operation of the image forming apparatus 10 in such a manner as to execute predetermined processing on the basis of a control program stored in the RAM 12 or the storage 13. In the description for this exemplary embodiment, the CPU 11 reads out the control program stored in the RAM 12 or the storage 13 and runs the program; however, how the control program is provided is not limited to this. The control program may be provided in such a manner as to be recorded in a computer-readable recording medium. For example, the program may also be provided in such a manner as to be recorded in an optical disk such as a compact disc (CD)-read only memory (ROM) or a digital versatile disc (DVD)-ROM or in a semiconductor memory such as a universal serial bus (USB) memory or a memory card. The control program may be acquired from an external apparatus through a communication network connected to the communication IF 14.

The detection device 20 has the CPU 11, the RAM 12, the storage 13, and the ultrasonic wave sensor 21. The ultrasonic wave sensor 21 is a sensor that detects a distance to a measurement target by radiating ultrasonic waves and then detecting an ultrasonic wave returning after being reflected from the measurement target.

The CPU 11, the RAM 12, and the storage 13 also serve as components of the detection device 20. The control program above controls not only the operation of the image forming apparatus 10 but also the operation of the ultrasonic wave sensor 21 to cause the image forming apparatus 10 and the detection device 20 to operate in cooperation with each other.

Figure 3:
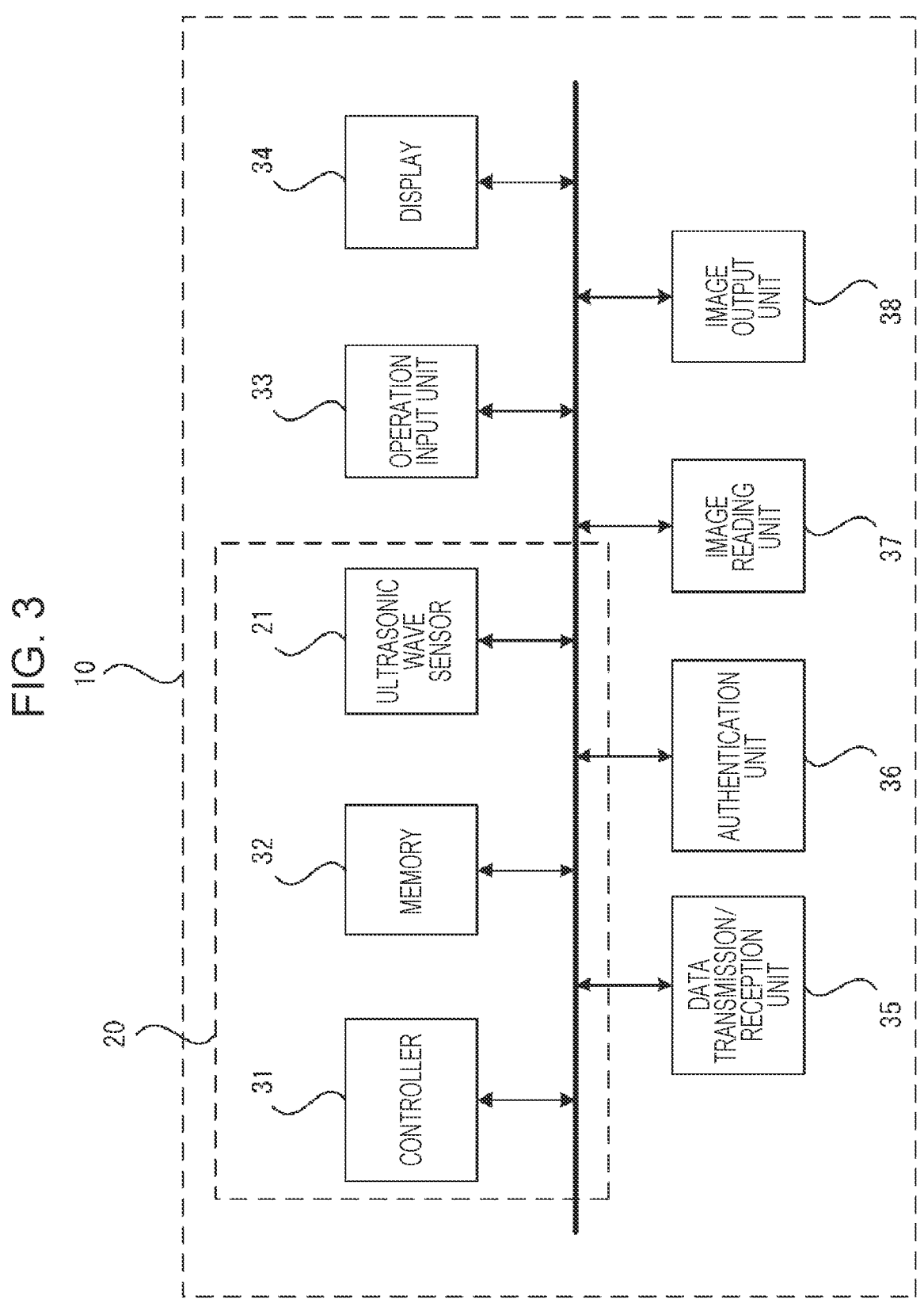
FIG. 3 is a block diagram illustrating the functional configuration of the image forming apparatus and the detection device.

The functional configuration of the image forming apparatus 10 and the detection device 20 of this exemplary embodiment will then be described. FIG. 3 is a block diagram illustrating the functional configuration of the image forming apparatus 10 and the detection device 20.

As illustrated in FIG. 3, the image forming apparatus 10 of this exemplary embodiment includes a controller 31, a memory 32, an operation input unit 33, a display 34, a data transmission/reception unit 35, an authentication unit 36, an image reading unit 37, an image output unit 38, and the ultrasonic wave sensor 21. The detection device 20 includes the controller 31, the memory 32, and the ultrasonic wave sensor 21 of these components.

The controller 31 controls the overall operation of the image forming apparatus 10 and the detection device 20 and performs control on the basis of instruction input from the user to cause, for example, the image reading unit 37 to read a document image and the image output unit 38 to output print data. The controller 31 also controls the ultrasonic wave sensor 21 and performs control to, for example, detect a measurement target. The memory 32 stores data for the control program and the like.

The operation input unit 33 inputs information regarding various operations performed by the user. The display 34 is controlled by the controller 31 and displays various pieces of information to the user. The data transmission/reception unit 35 transmits and receives data to and from an external apparatus. The authentication unit 36 executes an authentication process for a user who intends to use the image forming apparatus 10.

The image reading unit 37 reads a document image from a document placed on the image forming apparatus 10 under the control of the controller 31. The image output unit 38 outputs an image onto the recording medium such as a printing sheet under the control of the controller 31.

The controller 31 also performs control of the operation state of the image forming apparatus 10 to cause the image forming apparatus 10 to enter into a normal operation state if a user is present within a predetermined range (a first detection range R1 to be described later) from the image forming apparatus 10 and to enter into an energy-saving state if a user is not present in the predetermined range.

Figure 4:
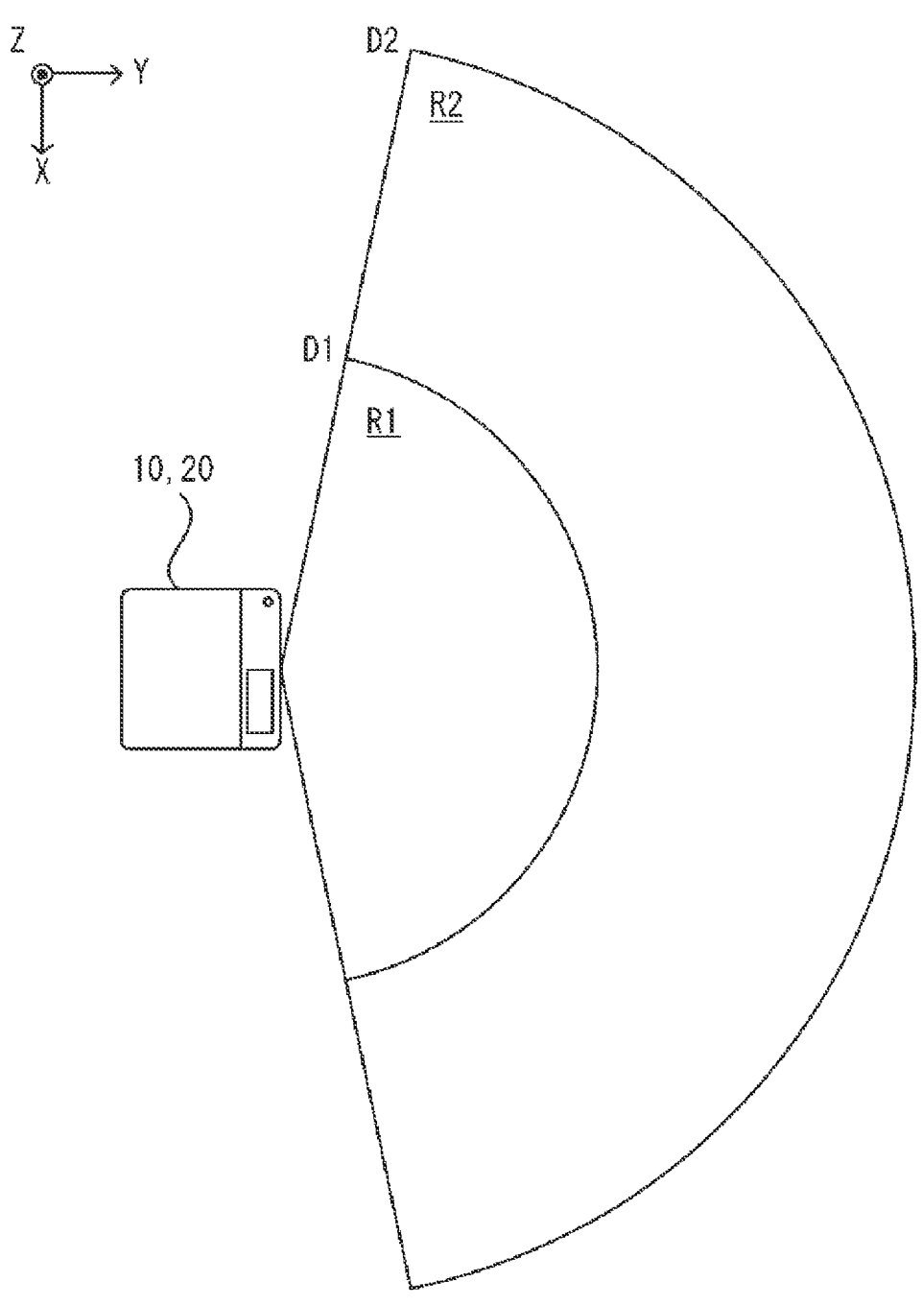
FIG. 4 is a view for explaining the detection range of the detection device and illustrates a state where a measurement target is not present in the detection range.
Figure 5:
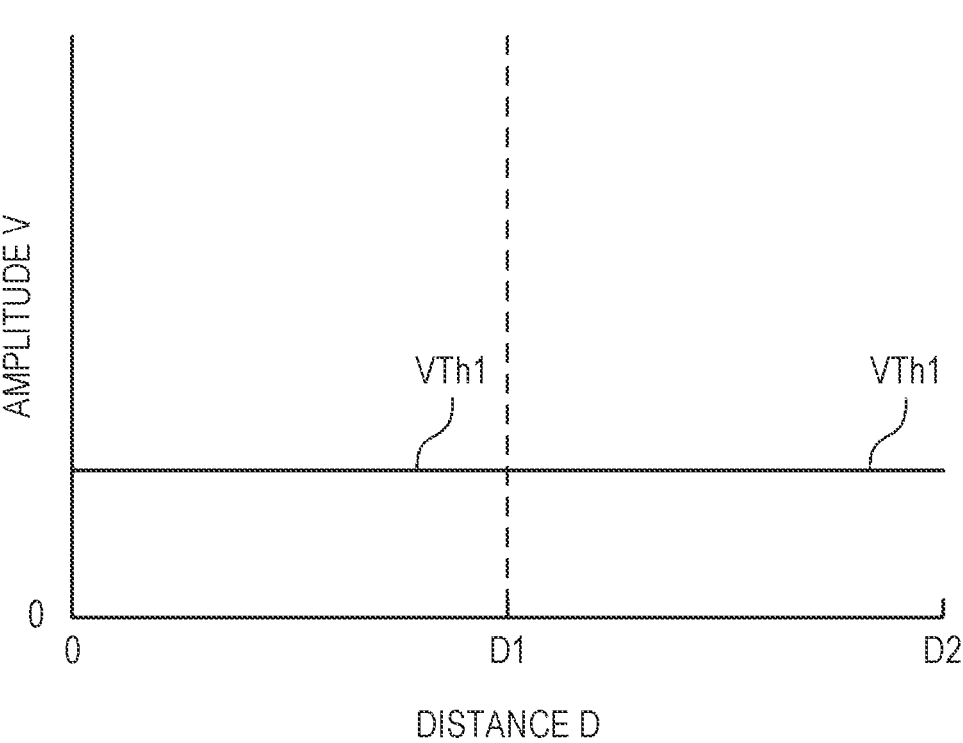
FIG. 5 is a graph illustrating the state of a detection signal of the ultrasonic wave sensor in the state in FIG. 4.

Hereinafter, detection of a measurement target by the detection device 20 included in the image forming apparatus 10 will be described in detail. FIG. 4 is a view for explaining the detection range of the detection device 20 of this exemplary embodiment and illustrates a state where a measurement target is not present in the detection range. FIG. 5 is a graph illustrating the state of a detection signal of the ultrasonic wave sensor 21 in the state in FIG. 4.

If a measurement target is detected in the first detection range R1 as part of a detection range in which a distance to a measurement target is detectable by the ultrasonic wave sensor 21 as illustrated in FIG. 4, the controller 31 changes the setting of the image forming apparatus 10 to cause a detection sensitivity for a second detection range R2 to be a second detection sensitivity lower than a first detection sensitivity set before the setting is changed. The second detection range R2 is outward of the first detection range R1 of the detection range of the ultrasonic wave sensor 21 viewed from the image forming apparatus 10.

If a measurement target is detected in the first detection range R1, and if the detected measurement target is moving away from the image forming apparatus 10, the controller 31 may also change the setting to change the detection sensitivity for the second detection range R2 from the second detection sensitivity to the first detection sensitivity.

In this exemplary embodiment, the detection sensitivity is changed, for example, in the following manner. On the basis of comparison between the amplitude value of a signal detected in the first detection range R1 by the ultrasonic wave sensor 21 and a predetermined first threshold for the first detection range R1 as illustrated in FIG. 5, the controller 31 detects the presence of the measurement target in the first detection range R1. On the basis of comparison between the amplitude value of a signal detected in the second detection range R2 by the ultrasonic wave sensor 21 and a predetermined second threshold for the second detection range R2, the controller 31 detects the presence of the measurement target in the second detection range R2. Before the measurement target is detected in the first detection range R1, the first threshold is the same as the second threshold. If the measurement target is detected in the first detection range R1, the controller 31 sets the second threshold to be higher than the first threshold.

Detection signals of the ultrasonic wave sensor 21 in cases where a measurement target is detected in any of multiple detection ranges of the detection device 20 and in each detection range will be described in detail.

As illustrated in FIG. 4, the first detection range R1 is a range in a distance D1 from the detection device 20 in the detection range in which a distance to the measurement target is detectable by the ultrasonic wave sensor 21. The second detection range R2 is a range in a distance D2 except the distance D1 in the detection range in which the distance to the measurement target is detectable by the ultrasonic wave sensor 21.

As illustrated in FIG. 5, a signal detected by the ultrasonic wave sensor 21 is represented as a pulse signal in the graph with the horizontal axis representing a distance D (m) from the detection device 20 and the vertical axis representing an amplitude V (V) of a voltage.

In this exemplary embodiment, the controller 31 uses, as a detection target, a measurement target only moving in the range detectable by the ultrasonic wave sensor 21 and does not use, as the detection target, a stationary measurement target even if the stationary measurement target is in the detectable range. Accordingly, a signal only moving in the horizontal axis direction (that is, dynamic data) appears in the graph illustrating the detection signal. This is designed to detect only a measurement target such as a person required to be detected for the control of the operation state of the image forming apparatus 10 and not to detect a standstill measurement target such as a bookshelf, a garbage box, or a foliage plant not required to be detected for the control of the operation state.

In the state in FIG. 4, a measurement target is not present in the range detectable by the ultrasonic wave sensor 21, and thus a signal representing the measurement target does not appear in the graph representing the detection signal.

In the graph representing the detection signal, a threshold VTh1 is set as a first threshold has been set in the area corresponding to the first detection range R1. If a signal having an amplitude V higher than or equal to the threshold VTh1 as the first threshold appears in the area corresponding to the first detection range R1, the controller 31 considers that a measurement target is present in the first detection range R1.

The threshold VTh1 is set to a value lower than the amplitude V of the signal appearing when a person assumed as a measurement target in the first detection range R1 is detected. The threshold VTh1 may be set to, for example, a 30% value of the value of a standard amplitude V of the detection signal of the person in the first detection range R1.

In the graph representing the detection signal, the second threshold is also set in the area corresponding to the second detection range R2. If a signal having an amplitude V higher than or equal to the second threshold appears in the area corresponding to the second detection range R2, the controller 31 considers that a measurement target is present in the second detection range R2.

In the state in FIG. 4, that is, in the state before the measurement target is detected in the first detection range R1, the controller 31 sets the first threshold and the second threshold to the same threshold VTh1.

Figure 6:
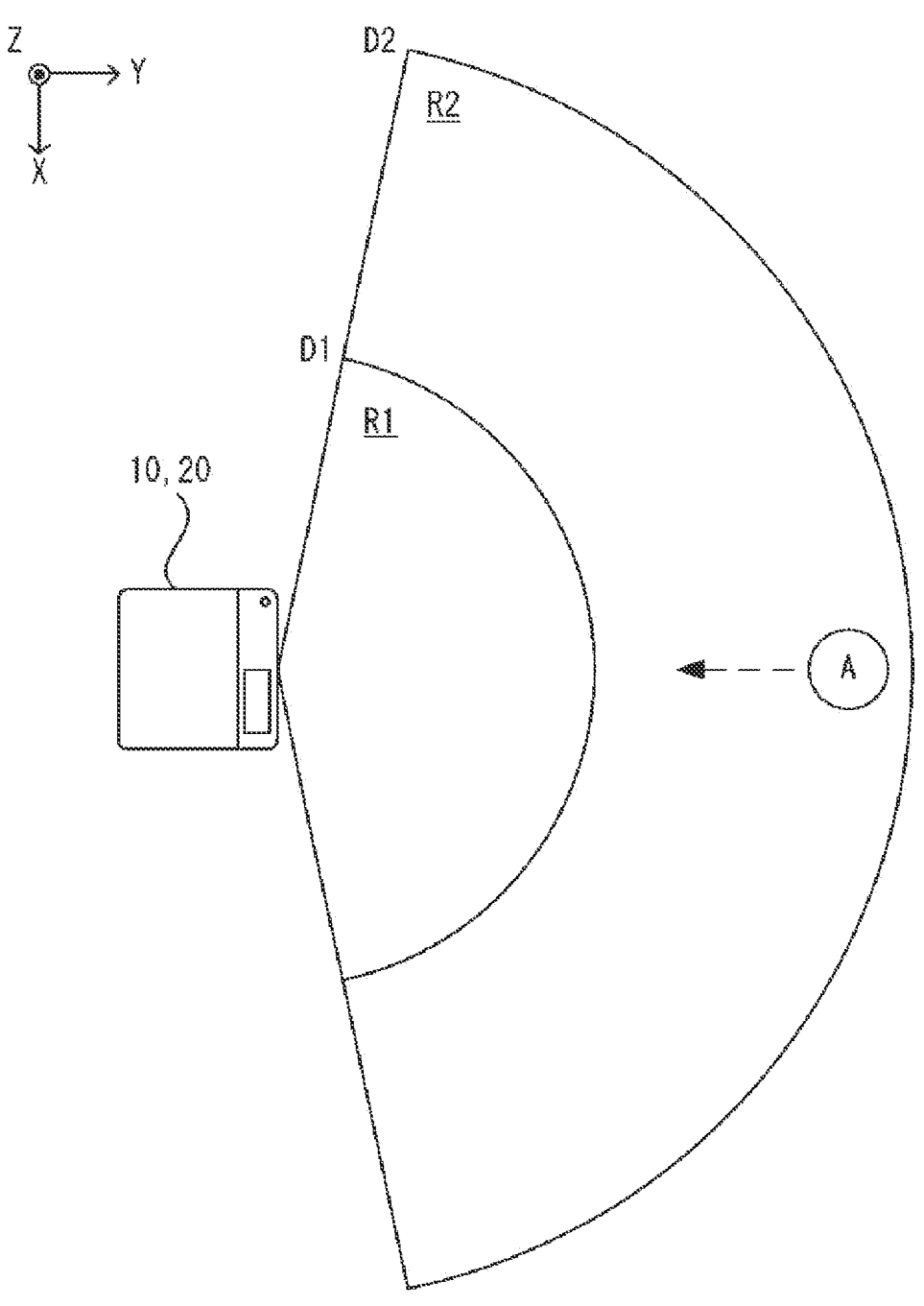
FIG. 6 is a view illustrating a state where a first measurement target has moved into a second detection range of the detection device.
Figure 7:
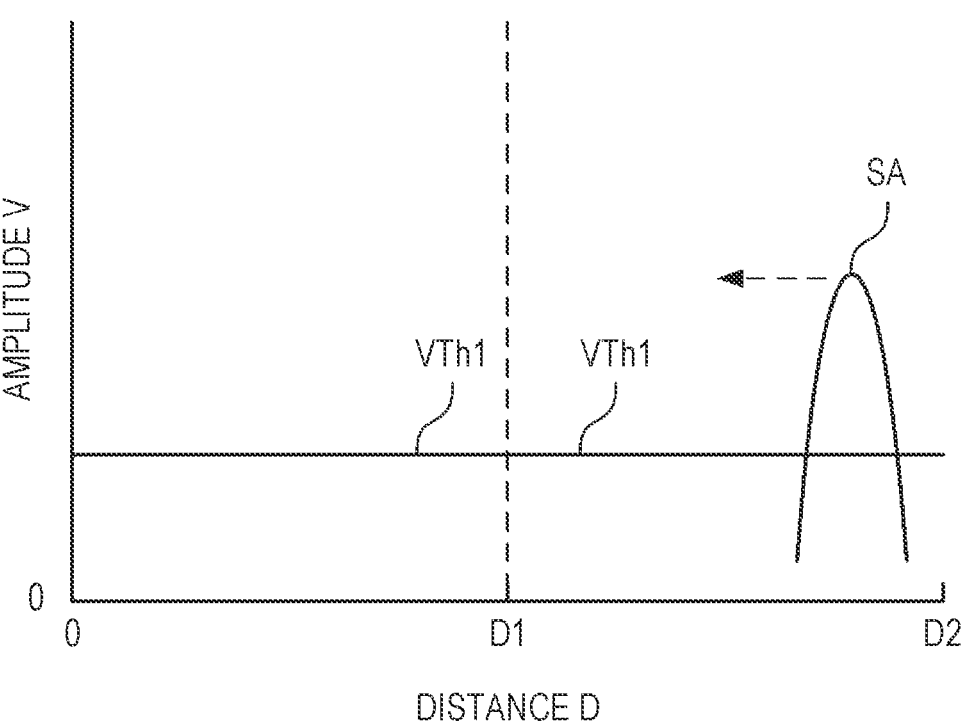
FIG. 7 is a graph illustrating the state of the detection signal of the ultrasonic wave sensor in the state in FIG. 6.

A case where a measurement target A has moved newly into the second detection range R2 from the state in FIG. 4 will then be described. FIG. 6 is a view illustrating a state where the measurement target A has moved into the second detection range R2 of the detection device 20. FIG. 7 is a graph illustrating the state of the detection signal of the ultrasonic wave sensor 21 in the state in FIG. 6.

As illustrated in FIG. 6, the measurement target A who is a user has moved from outside the second detection range R2 newly into the second detection range R2.

In this case, as illustrated in FIG. 7, a signal SA representing the measurement target A appears in the area corresponding to the second detection range R2 in the graph representing the detection signal.

Since the amplitude V of the signal SA appearing in the area corresponding to the second detection range R2 has a value higher than or equal to the threshold VTh1 as the second threshold, the controller 31 considers that a measurement target is present in the second detection range R2.

Figure 8:
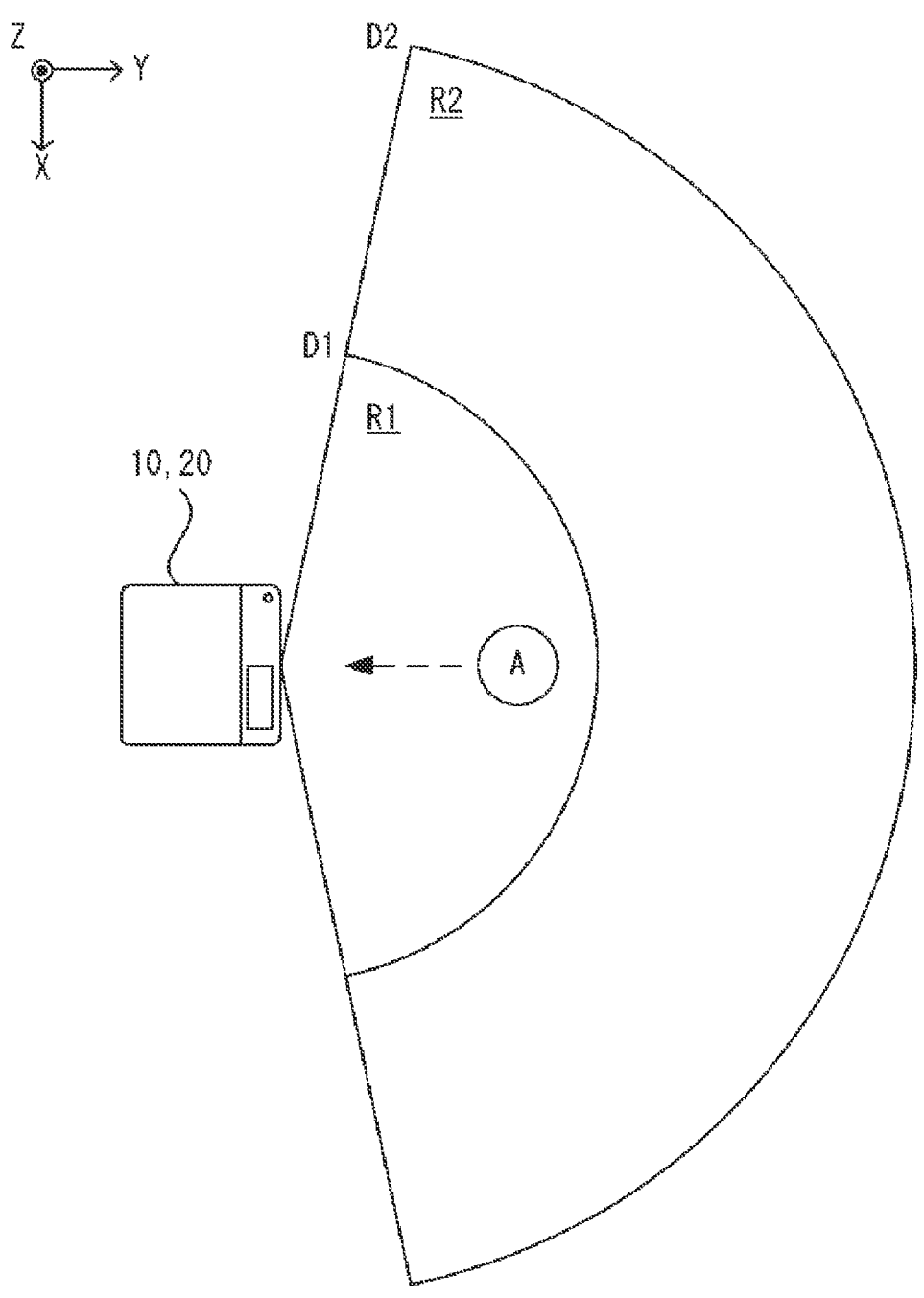
FIG. 8 is a view illustrating a state where the first measurement target has moved into a first detection range of the detection device.
Figure 9:
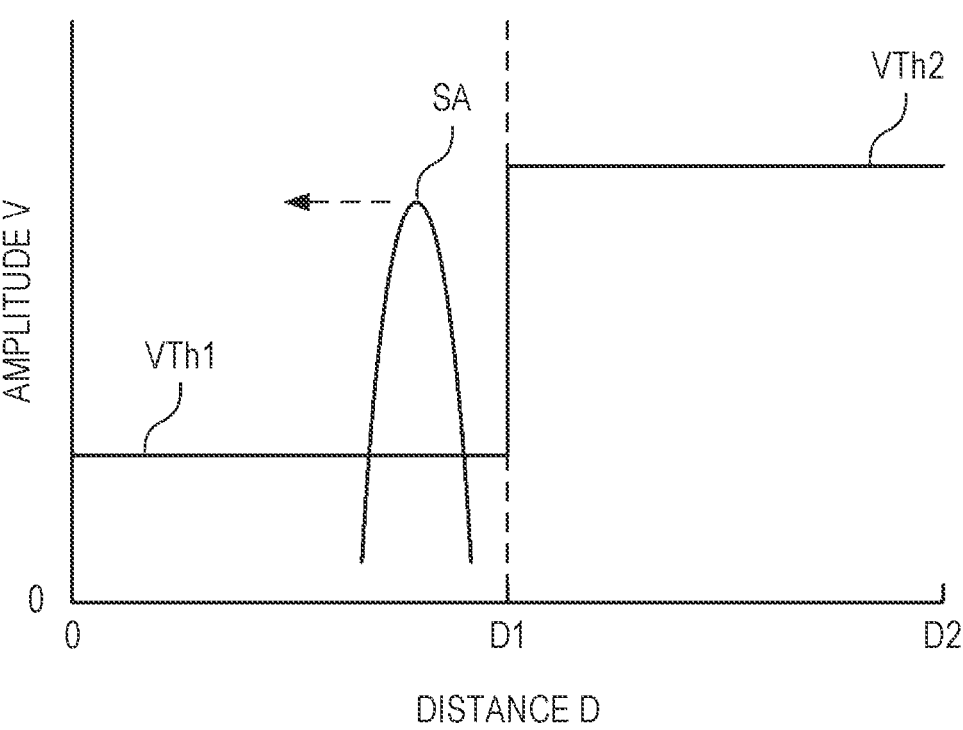
FIG. 9 is a graph illustrating the state of the detection signal of the ultrasonic wave sensor in the state in FIG. 8.

A case where the measurement target A has moved newly into the first detection range R1 from the state in FIG. 6 will then be described. FIG. 8 is a view illustrating a state where the measurement target A has moved into the first detection range R1 of the detection device 20. FIG. 9 is a graph illustrating the state of the detection signal of the ultrasonic wave sensor 21 in the state in FIG. 8.

As illustrated in FIG. 8, the measurement target A who is the user has moved from the second detection range R2 newly into the first detection range R1.

In this case, as illustrated in FIG. 9, the signal SA representing the measurement target A appears in the area corresponding to the first detection range R1 in the graph representing the detection signal.

Since the amplitude V of the signal SA appearing in the area corresponding to the first detection range R1 has a value higher than or equal to the threshold VTh1 as the first threshold, the controller 31 considers that a measurement target is present in the first detection range R1. Further, since the measurement target is detected in the first detection range R1, the controller 31 sets the second threshold to a threshold VTh2 higher than the threshold VTh1 as the first threshold.

The threshold VTh2 is set to a value higher than the amplitude V of the signal appearing when a person assumed as a measurement target is detected in the second detection range R2. The threshold VTh2 may be set to, for example, a 130% value of the value of a standard amplitude V of the detection signal of a person in the second detection range R2.

Figure 10:
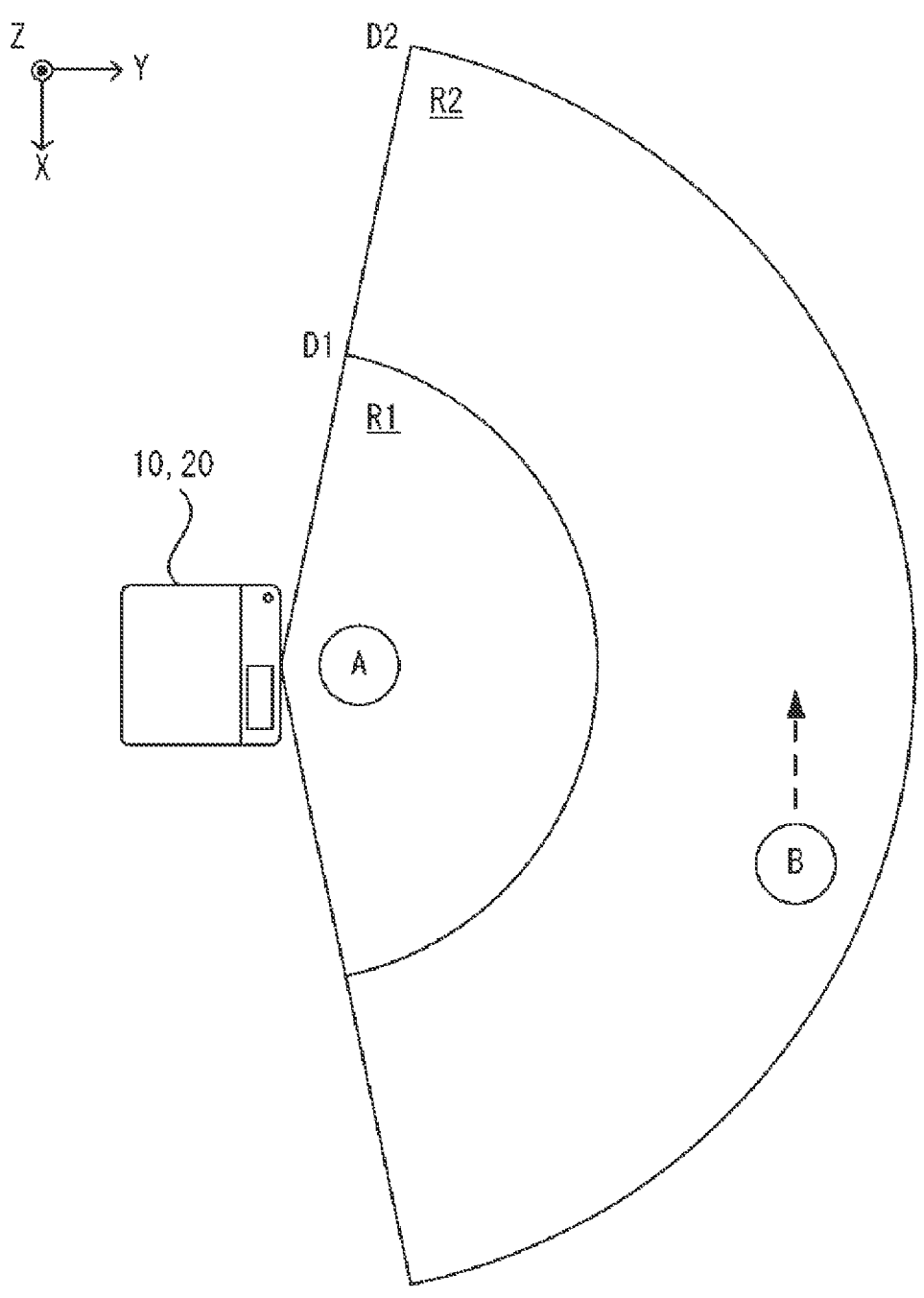
FIG. 10 is a view illustrating a state where a second measurement target has moved into the second detection range of the detection device.
Figure 11:
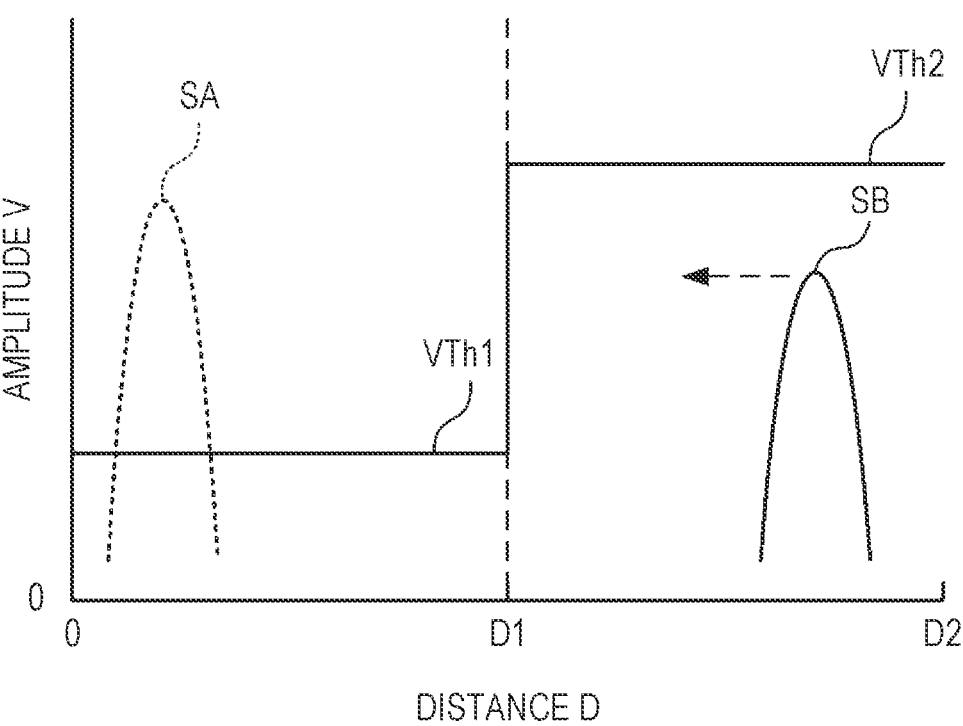
FIG. 11 is a graph illustrating the state of the detection signal of the ultrasonic wave sensor in the state in FIG. 10.

A case where a measurement target B has moved newly into the second detection range R2 from the state in FIG. 8 will then be described. FIG. 10 is a view illustrating a state where the measurement target B has moved into the second detection range R2 of the detection device 20. FIG. 11 is a graph illustrating the state of the detection signal of the ultrasonic wave sensor 21 in the state in FIG. 10.

As illustrated in FIG. 10, the measurement target A who is the user has come to a standstill in front of the image forming apparatus 10, and the measurement target B who is not a user has moved from outside the second detection range R2 newly into the second detection range R2.

In this case, as illustrated in FIG. 11, the signal SA representing the measurement target A has appeared but disappears in the area corresponding to the first detection range R1 in the graph representing the detection signal, and a signal SB representing the measurement target B appears in the area corresponding to the second detection range R2.

Since the signal SA having appeared in the area corresponding to the first detection range R1 disappears without moving into the second detection range R2, the controller 31 considers that a measurement target is present in the first detection range R1. In addition, since the amplitude V of the signal SB appearing in the area corresponding to the second detection range R2 has a value lower than the threshold VTh2 as the second threshold, the controller 31 considers that a measurement target is not present in the second detection range R2.

Figure 12:
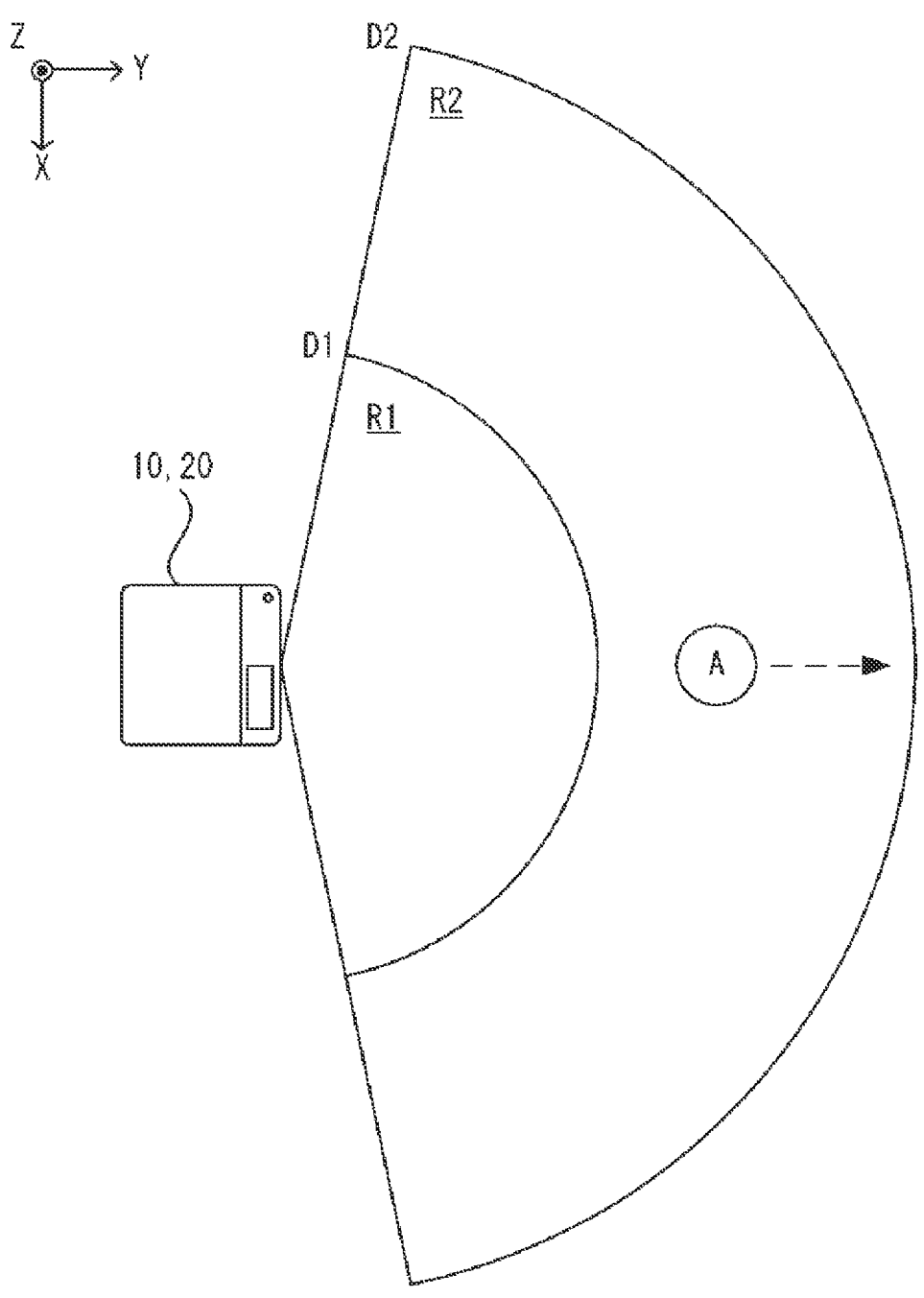
FIG. 12 is a view illustrating a state where the first measurement target has moved into the second detection range of the detection device.
Figure 13:
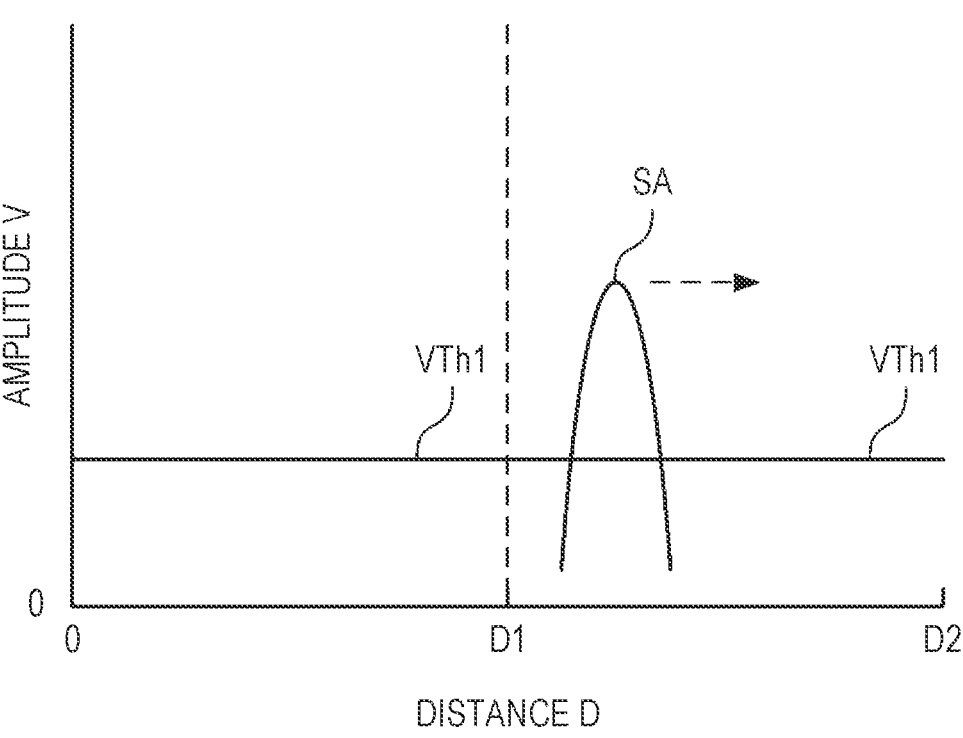
FIG. 13 is a graph illustrating the state of the detection signal of the ultrasonic wave sensor in the state in FIG. 12.

A case where the measurement target A has moved into the second detection range R2 from the state in FIG. 10 will then be described. FIG. 12 is a view illustrating a state where the measurement target A has moved into the second detection range R2 of the detection device 20. FIG. 13 is a graph illustrating the state of the detection signal of the ultrasonic wave sensor 21 in the state in FIG. 12.

As illustrated in FIG. 12, the measurement target A who is the user has moved from the first detection range R1 to the second detection range R2, and the measurement target B who is not a user has moved to the outside of the second detection range R2.

In this case, as illustrated in FIG. 13, the signal SA representing the measurement target A appears in the area corresponding to the second detection range R2 in the graph representing the detection signal.

Since a measurement target detected in the first detection range R1 has moved into the second detection range R2, the controller 31 sets the first threshold and the second threshold to the same threshold VTh1. Further, since the amplitude V of the signal SA appearing in the area corresponding to the second detection range R2 has a value higher than or equal to the threshold VTh1 as the second threshold, the controller 31 considers that a measurement target is present in the second detection range R2.

With this configuration, a measurement target is detected in a detection range wider than the first detection range R1 serving as the reference for control of the operation state of the image forming apparatus 10 by the controller 31. In addition, if a measurement target is present in the first detection range R1, a measurement target who is present in the second detection range R2 and who is not required to be detected for the control of the operation state of the image forming apparatus 10 by the controller 31 is not detected.

In the example described above, the threshold VTh2 is set to a value that does not vary with the moving state and that is higher than the amplitude V of the signal appearing when a person assumed as a measurement target is detected in the second detection range R2.

Instead of the aspect as described above, if the moving state of a measurement target detected in the second detection range R2 is a specific moving state, the value of the threshold VTh2 may be set to be lower than that in the specific moving state.

For example, the following aspect may be employed. If the moving speed of the measurement target detected in the second detection range R2 is lower than the set threshold, the threshold VTh2 is set to the 130% value of the value of the standard amplitude V of the detection signal of a person in the second detection range R2. If the moving speed of the measurement target detected in the second detection range R2 is higher than or equal to the set threshold, the threshold VTh2 is set to an 80% value of the value of the standard amplitude V of the detection signal of a person in the second detection range R2.

The following aspect may also be employed. If the measurement target detected in the second detection range R2 approaches the image forming apparatus 10 linearly, the threshold VTh2 is set to the 130% value of the value of the standard amplitude V of the detection signal of a person in the second detection range R2. If the measurement target detected in the second detection range R2 does not approach the image forming apparatus 10 linearly, the threshold VTh2 is set to the 80% value of the value of the standard amplitude V of the detection signal of a person in the second detection range R2.

According to the aspects as described above, if a measurement target is present in the first detection range R1, but if the moving state of the measurement target detected in the second detection range R2 is a specific moving state, the measurement target is easier to detect than in the aspect in which the threshold VTh2 is set to a value not varying with the moving state.

In the example above, the controller 31 sets the first threshold and the second threshold to the same threshold VTh1 when the measurement target detected in the first detection range R1 moves into the second detection range R2.

Instead of the aspect as described above, even before the measurement target detected in the first detection range R1 moves into the second detection range R2, the controller 31 may set the first threshold and the second threshold to the same threshold VTh1 when moving of the measurement target detected in the first detection range R1 toward the second detection range R2 is detected.

Figure 14:
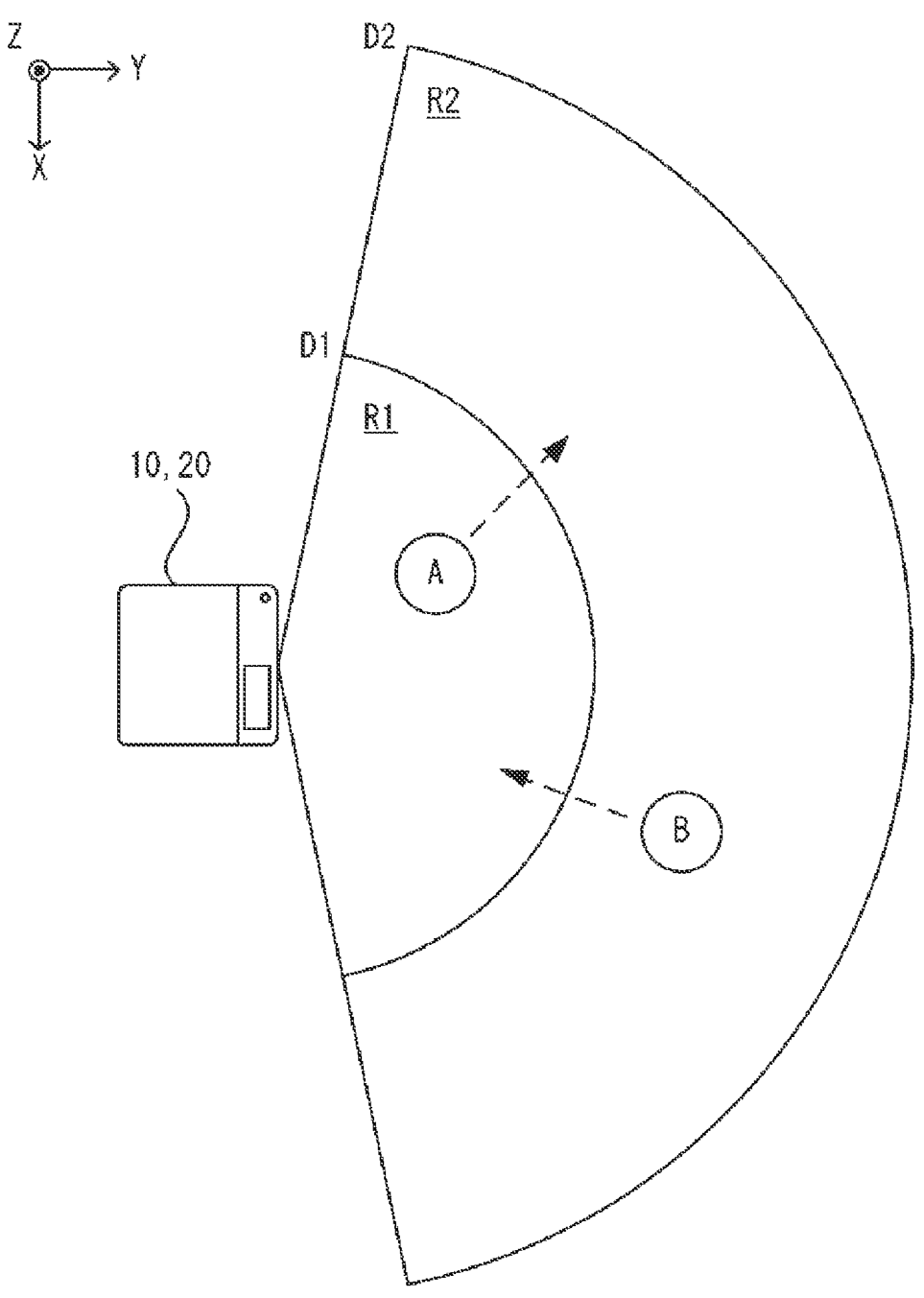
FIG. 14 is a view illustrating a state where the first measurement target is present in the first detection range of the detection device, the second measurement target is present in the second detection range, and the first measurement target is moving away from the detection device.
Figure 15:
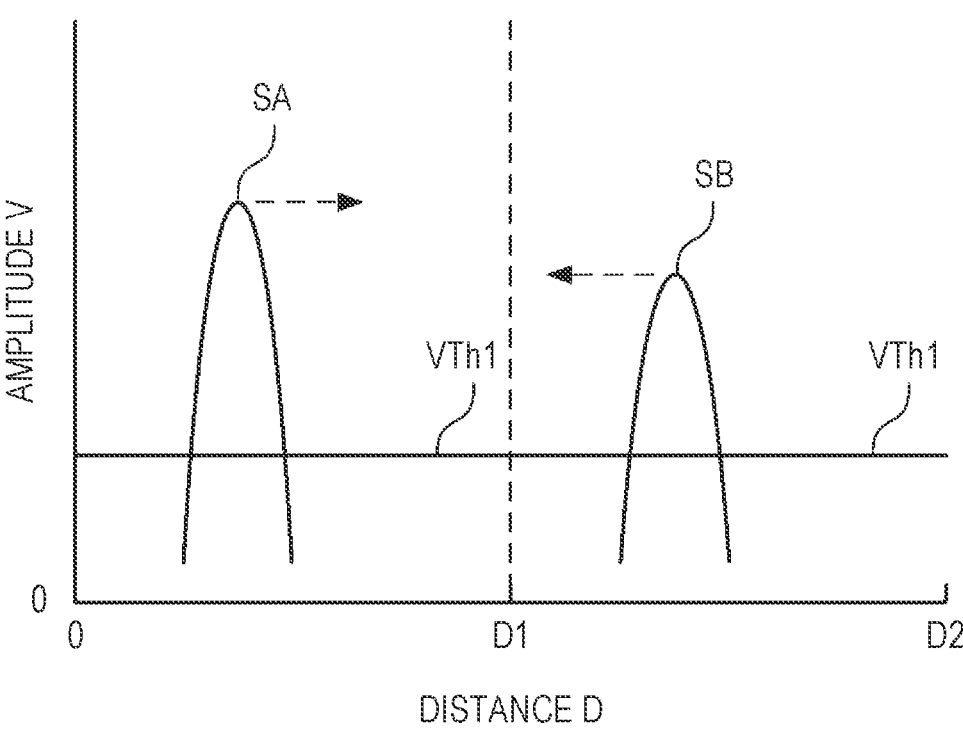
FIG. 15 is a graph illustrating the state of the detection signal of the ultrasonic wave sensor in the state in FIG. 14.

The situation as described above will be described with reference to the drawings. FIG. 14 is a view illustrating a state where the measurement target A is present in the first detection range R1 of the detection device 20, the measurement target B is present in the second detection range R2, and the measurement target A is moving away from the detection device 20. FIG. 15 is a graph illustrating the state of the detection signal of the ultrasonic wave sensor 21 in the state in FIG. 14.

As illustrated in FIG. 14, the measurement target A who is the user is moving from the first detection range R1 toward the second detection range R2, and the measurement target B who is a possible new user has moved into the second detection range R2.

In this case, as illustrated in FIG. 15, the signal SA representing the measurement target A in the area corresponding to the first detection range R1 in the graph representing the detection signal moves toward the second detection range R2, and the signal SB representing the measurement target B appears in the area corresponding to the second detection range R2.

Sine a measurement target detected in the first detection range R1 has moved toward the second detection range R2, the controller 31 sets the first threshold and the second threshold to the same threshold VTh1. Further, since the amplitude V of the signal SB appearing in the area corresponding to the second detection range R2 has a value higher than or equal to the threshold VTh1 as the second threshold, the controller 31 considers that a measurement target is present in the second detection range R2.

If multiple respective measurement targets are detected in the first detection range R1 and the second detection range R2, the controller 31 may use only a measurement target detected in the first detection range R1 as a detected measurement target.

Figure 16:
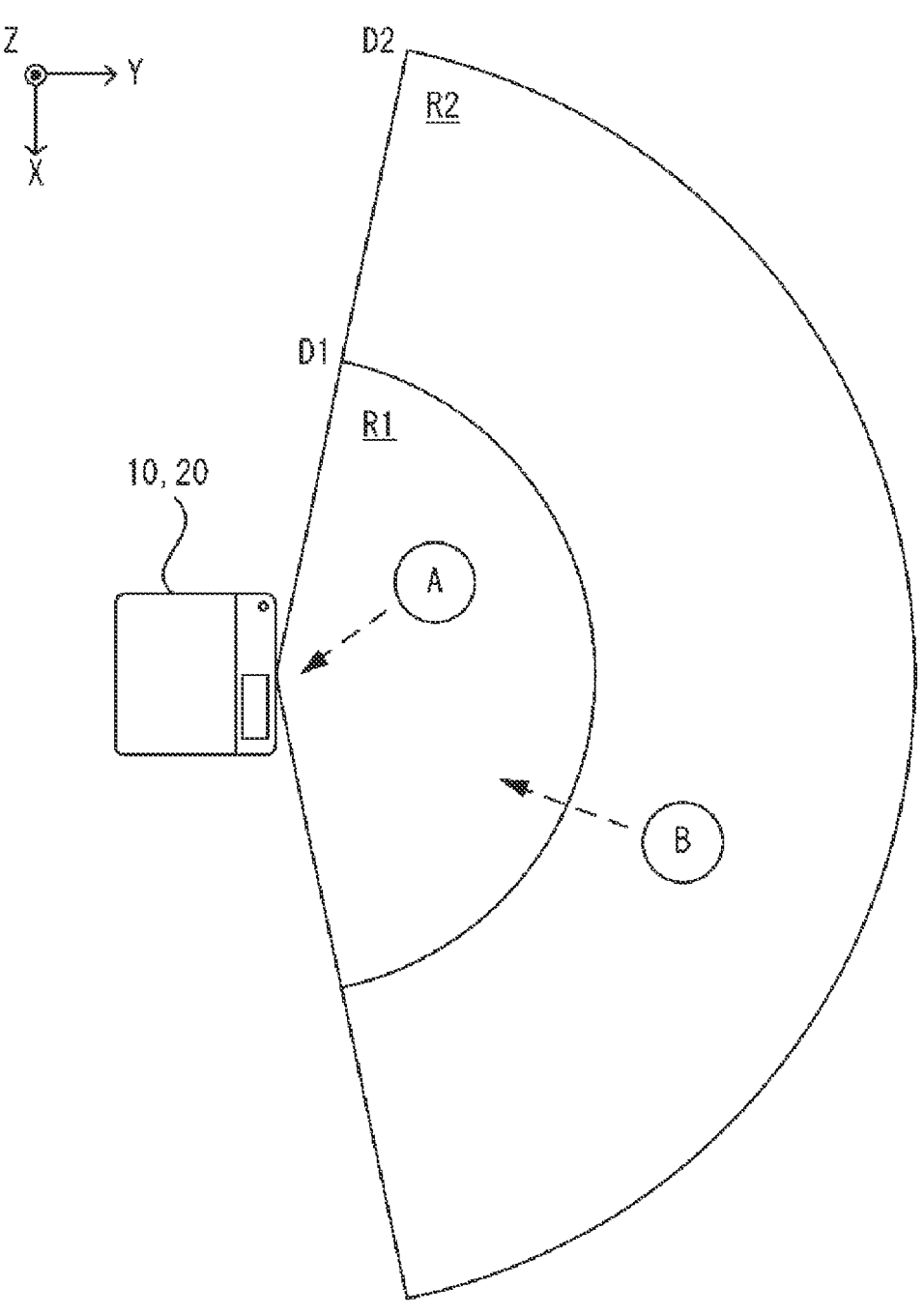
FIG. 16 is a view illustrating a state where the measurement targets are present in the respective first and second detection ranges of the detection device.
Figure 17:
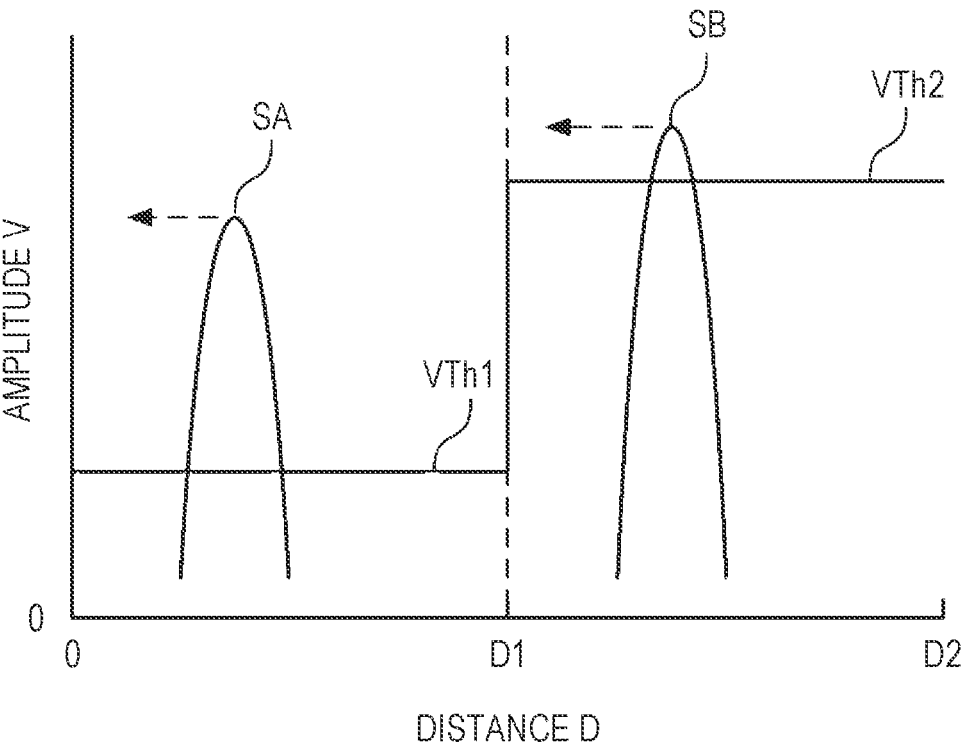
FIG. 17 is a graph illustrating the state of the detection signal of the ultrasonic wave sensor in the state in FIG. 16.

The situation as described above will be described with reference to the drawings. FIG. 16 is a view illustrating a state where the respective measurement targets are present in the first detection range R1 and the second detection range R2 of the detection device 20. FIG. 17 is a graph illustrating the state of the detection signal of the ultrasonic wave sensor 21 in the state in FIG. 16.

As illustrated in FIG. 16, the respective measurement targets are present in the first detection range R1 and the second detection range R2 of the detection device 20.

In this case, as described above, the threshold VTh2 as the second threshold is set higher than the threshold VTh1 as the first threshold, and thus the amplitude V of the signal SB appearing in the area corresponding to the second detection range R2 has typically the value lower than the second threshold VTh2. The controller 31 thus considers that a measurement target is not present in the second detection range R2.

However, if the reflection intensity of the ultrasonic wave from the measurement target B is exceptionally high, not only the amplitude V of the signal SA in the first detection range R1 in the graph representing the detection signal has a value higher than or equal to the threshold VTh1 as the first threshold, but also the amplitude V of the signal SB in the second detection range R2 has a value higher than or equal to the threshold VTh2 as the second threshold, as illustrated in FIG. 17. In this case, the controller 31 considers that a measurement target is present only in the first detection range R1.

If the multiple measurement targets are detected in the first detection range R1, the controller 31 may use, as a detected measurement target, a measurement target detected at the position closest to the detection device 20.

Figure 18:
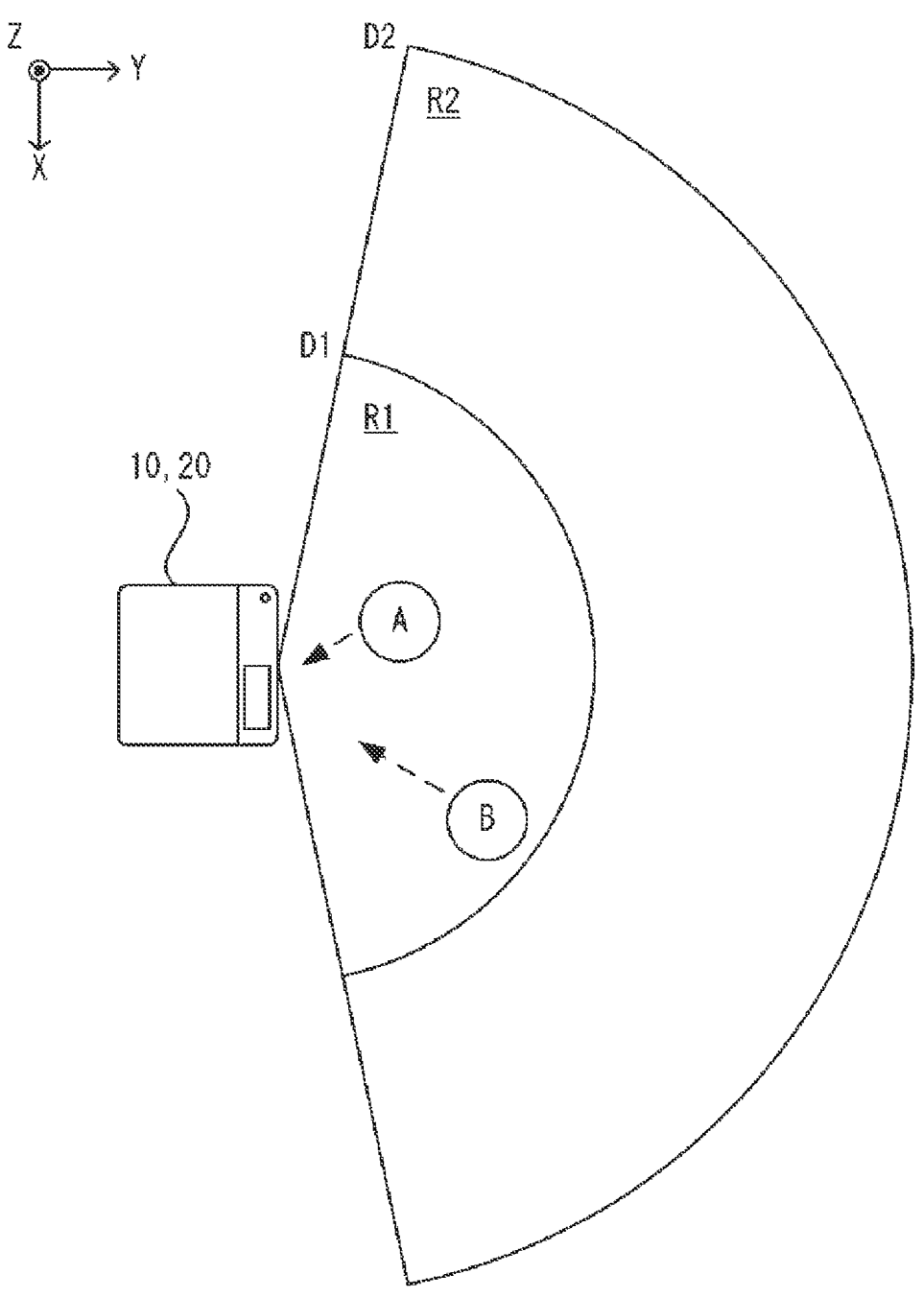
FIG. 18 is a view illustrating a state where the multiple measurement targets are present in the first detection range of the detection devices.
Figure 19:
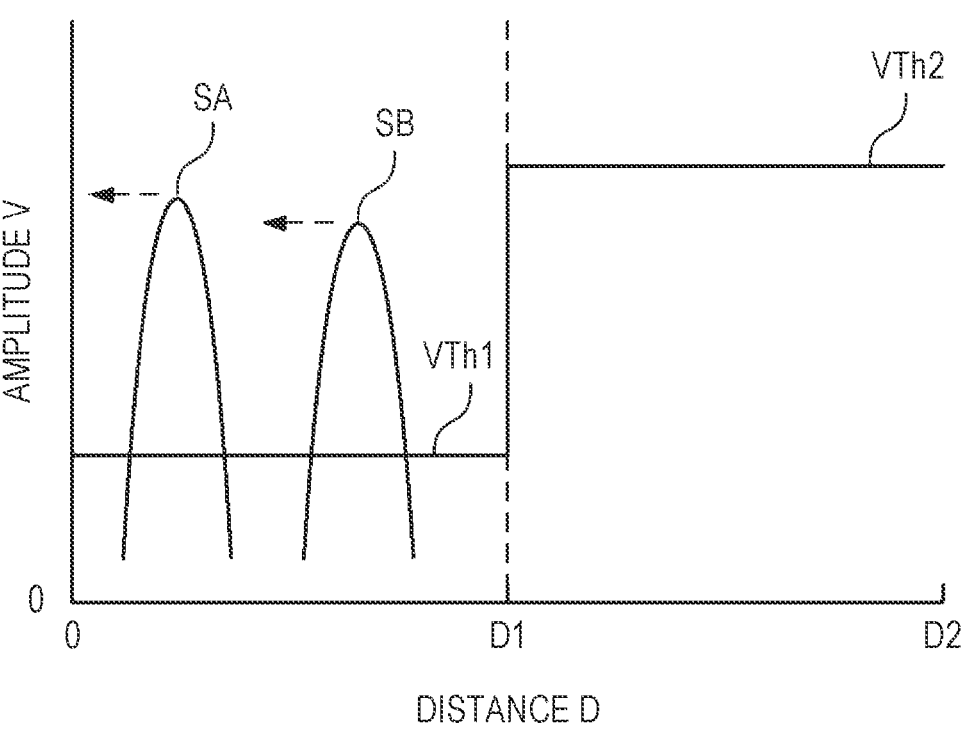
FIG. 19 is a graph illustrating the state of the detection signal of the ultrasonic wave sensor in the state in FIG. 18.

The situation as described above will be described with reference to the drawings. FIG. 18 is a view illustrating a state where multiple measurement targets are present in the first detection range R1 of the detection device 20. FIG. 19 is a graph illustrating the state of the detection signal of the ultrasonic wave sensor 21 in the state in FIG. 18.

As illustrated in FIG. 18, the multiple measurement targets, that is, the measurement target A and the measurement target B are present in the first detection range R1 of the detection device 20.

In this case, as illustrated in FIG. 19, the amplitude V of both of the signal SA and the signal SB appearing in the area corresponding to the first detection range R1 has a value higher than or equal to the threshold VTh1 as the first threshold, but the controller 31 considers, as a measurement target, only the signal SA detected at the position closest to the detection device 20 in the first detection range R1.

If a measurement target is not detected in the first detection range R1, and if multiple measurement targets are detected in the second detection range R2, the controller 31 may use a measurement target approaching the detection device 20 as a detected measurement target.

Figure 20:
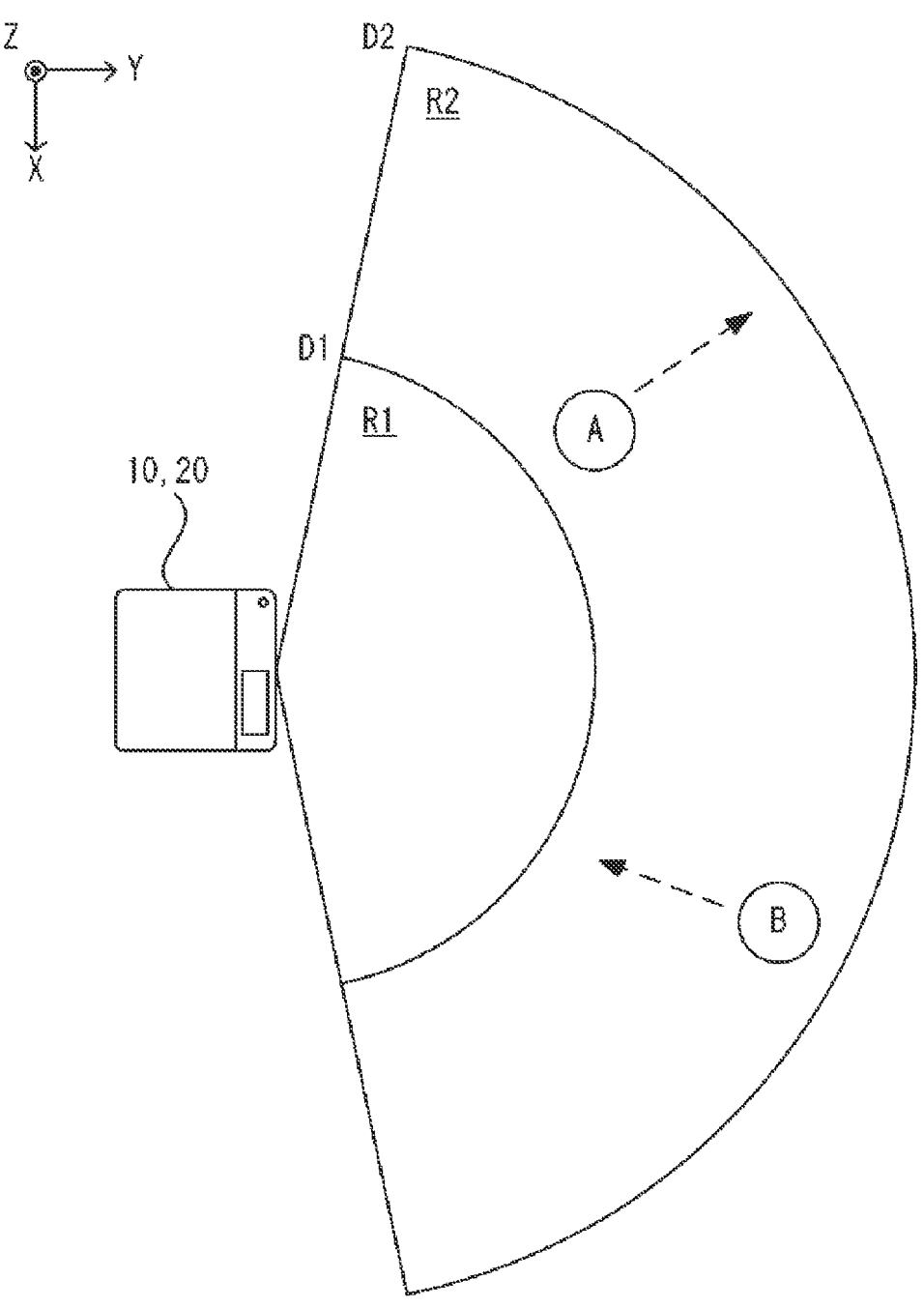
FIG. 20 is a view illustrating a state where the multiple measurement targets are present in the second detection range of the detection devices.
Figure 21:
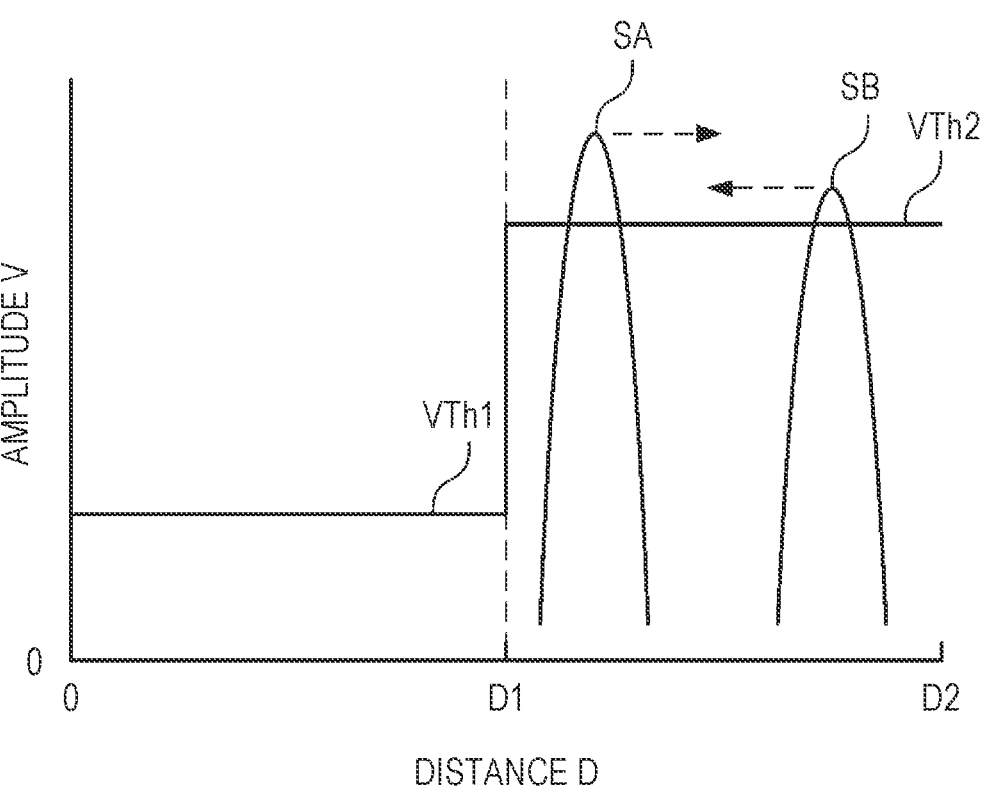
FIG. 21 is a graph illustrating the state of the detection signal of the ultrasonic wave sensor in the state in FIG. 20.

The situation as described above will be described with reference to the drawings. FIG. 20 is a view illustrating a state where the multiple measurement targets are present in the second detection range R2 of the detection device 20. FIG. 21 is a graph illustrating the state of the detection signal of the ultrasonic wave sensor 21 in the state in FIG. 20.

As illustrated in FIG. 20, the multiple measurement targets, that is, the measurement target A and the measurement target B are present in the second detection range R2 of the detection device 20.

In this case, as illustrated in FIG. 21, if the amplitude V of both of the signal SA and the signal SB appearing in the area corresponding to the second detection range R2 exceptionally have a value higher than or equal to the threshold VTh2 as the second threshold, the controller 31 considers, as a measurement target, only the signal SB approaching the detection device 20 in the second detection range R2.

In addition, a 1a detection range R1a that is a detection range as part of the first detection range R1 and that is closest to the detection device 20 is set. If a measurement target detected in the first detection range R1 and outside the 1a detection range R1a is moving away from the detection device 20, the controller 31 changes the setting to change the detection sensitivity for the second detection range from the second detection sensitivity to the first detection sensitivity. If the detected measurement target is moving away from the detection device 20, but if the detected measurement target is present in the 1a detection range R1a, the controller 31 may use, as a detected measurement target, a measurement target detected in the 1a detection range R1a. The 1a detection range R1a is an example of a third detection range in the technology of the present disclosure.

Figure 22:
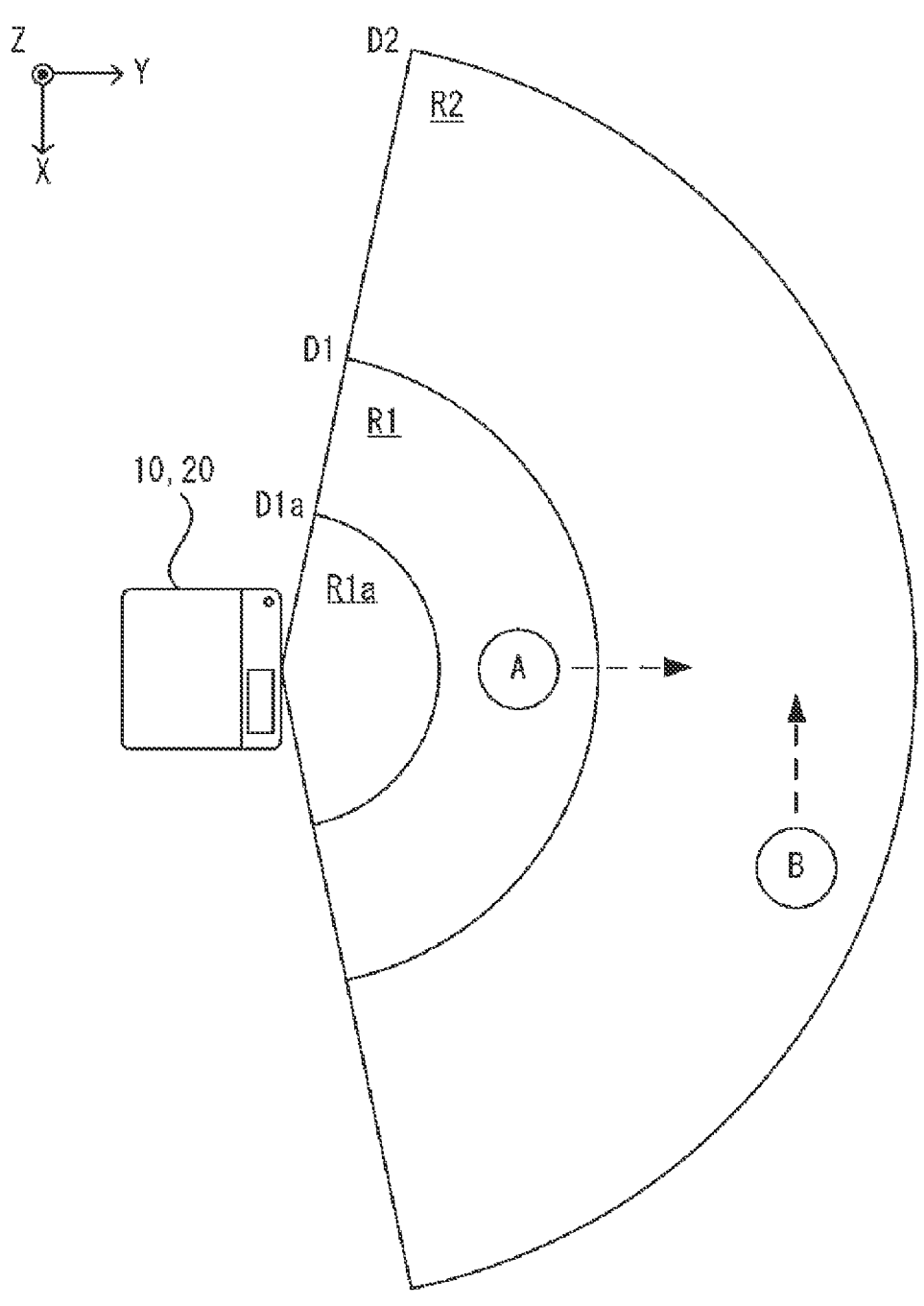
FIG. 22 is a view illustrating a state where the first measurement target is present in the first detection range of the detection device, the second measurement target is present in the second detection range, and the first measurement target is moving away from the detection device.
Figure 23:
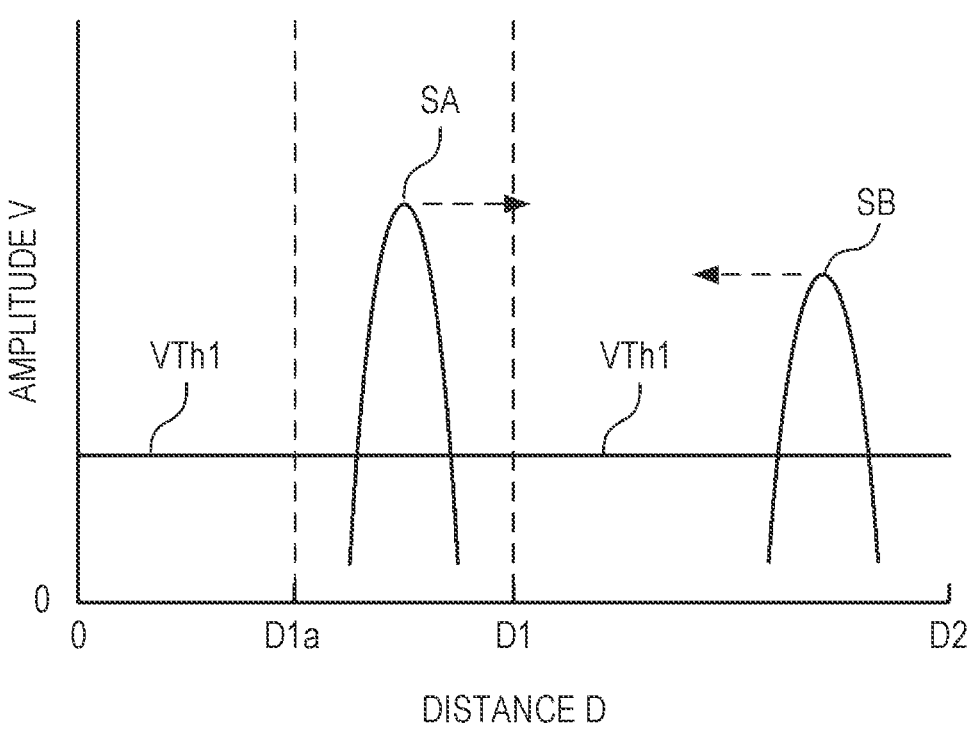
FIG. 23 is a graph illustrating the state of the detection signal of the ultrasonic wave sensor in the state in FIG. 22.

The situation as described above will be described with reference to the drawings. FIG. 22 is a view illustrating a state where the measurement target A is present in the first detection range R1 of the detection device 20 and outside the 1a detection range R1a, the measurement target B is present in the second detection range R2, and the measurement target A is moving away from the detection device 20. FIG. 23 is a graph illustrating the state of the detection signal of the ultrasonic wave sensor 21 in the state in FIG. 22.

As illustrated in FIG. 22, the 1a detection range R1a is a range in a distance D1a from the detection device 20 in the detection range in which a distance to a measurement target is detectable by the ultrasonic wave sensor 21. The distance D1a from the detection device 20 is shorter than the distance D1 from the detection device 20.

As illustrated in FIG. 22, the measurement target A who is the user is moving from the first detection range R1 toward the second detection range R2, and the measurement target B who is a possible new user has moved into the second detection range R2.

In this case, as illustrated in FIG. 23, the signal SA representing the measurement target A in the area corresponding to the first detection range R1 in the graph representing the detection signal moves toward the second detection range R2, and the signal SB representing the measurement target B appears in the area corresponding to the second detection range R2.

Sine a measurement target detected in the first detection range R1 has moved toward the second detection range R2, the controller 31 sets the first threshold and the second threshold to the same threshold VTh1. Further, since the amplitude V of the signal SB appearing in the area corresponding to the second detection range R2 has a value higher than or equal to the threshold VTh1 as the second threshold, the controller 31 considers that a measurement target is present in the second detection range R2.

Figure 24:
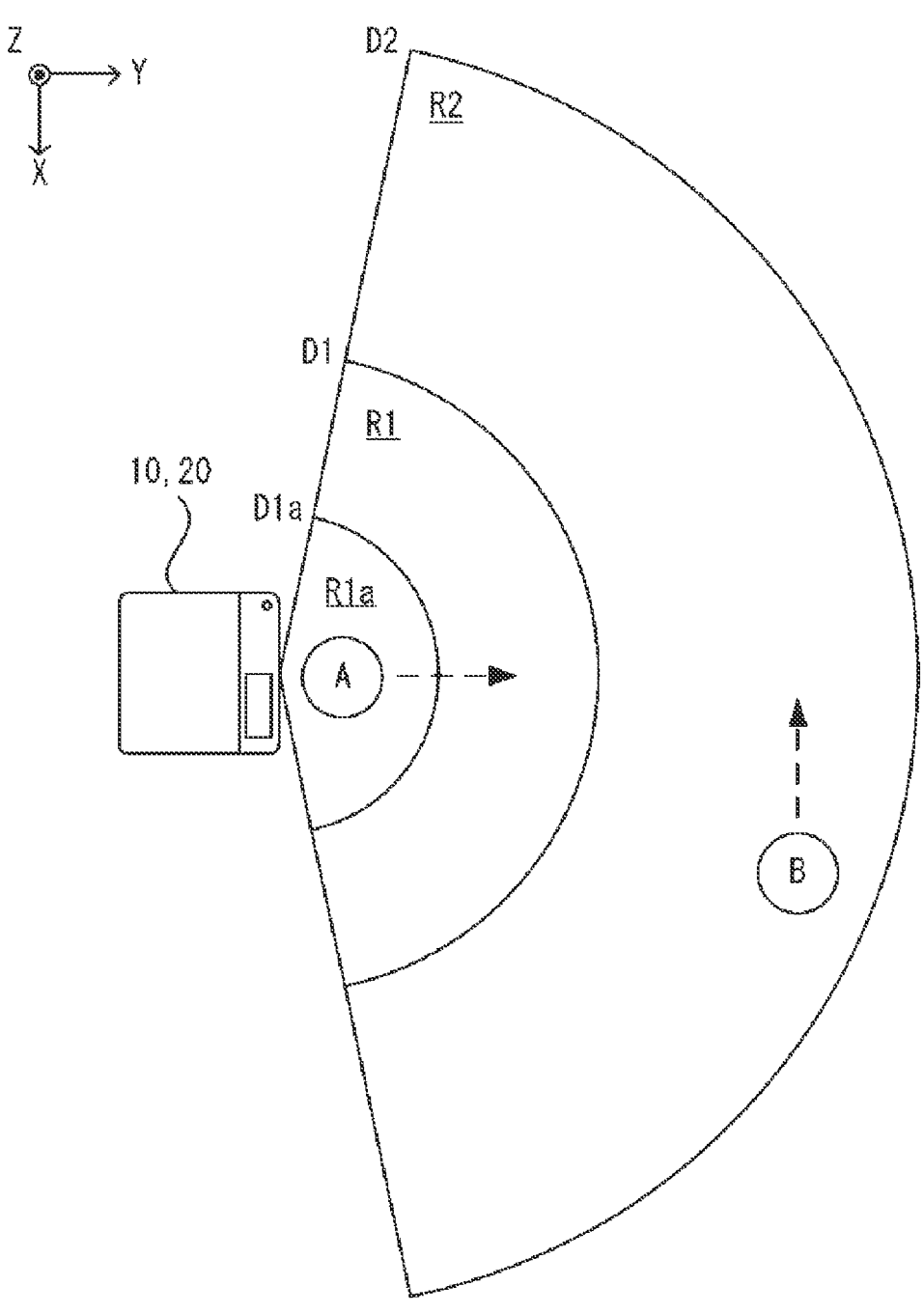
FIG. 24 is a view illustrating a state where the first measurement target is present in a $1a$ detection range of the detection device, the second measurement target is present in the second detection range, and the first measurement target is moving away from the detection device.
Figure 25:
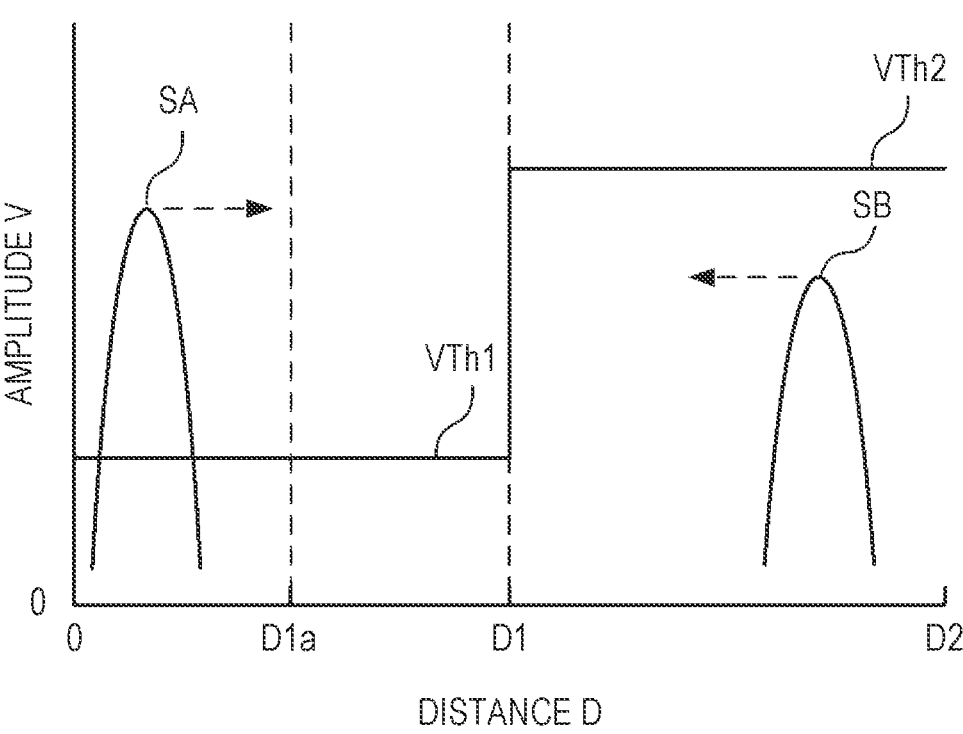
FIG. 25 is a graph illustrating the state of the detection signal of the ultrasonic wave sensor in the state in FIG. 24.

FIG. 24 is a view illustrating a state where the measurement target A is present in the 1a detection range R1a of the detection device 20, the measurement target B is present in the second detection range R2, and the measurement target A is moving away from the detection device 20. FIG. 25 is a graph illustrating the state of the detection signal of the ultrasonic wave sensor 21 in the state in FIG. 24.

As illustrated in FIG. 24, the measurement target A who is the user is moving from the 1a detection range R1a toward the second detection range R2, and the measurement target B who is a possible new user has moved into the second detection range R2.

In this case, as illustrated in FIG. 25, the signal SA representing the measurement target A in the area corresponding to the 1a detection range R1a in the graph representing the detection signal moves toward the second detection range R2, and the signal SB representing the measurement target B appears in the area corresponding to the second detection range R2.

Since the measurement target A is present in the 1a detection range R1a close to the detection device 20 in the first detection range R1, the controller 31 maintains the second threshold at the threshold VTh2. Accordingly, the signal SB appearing in the area corresponding to the second detection range R2 is not considered as a signal of a measurement target.

In this case, if a measurement target detected in the 1a detection range R1a is not moving, the controller 31 may consider, not as a measurement target, the detected measurement target.

Figure 26:
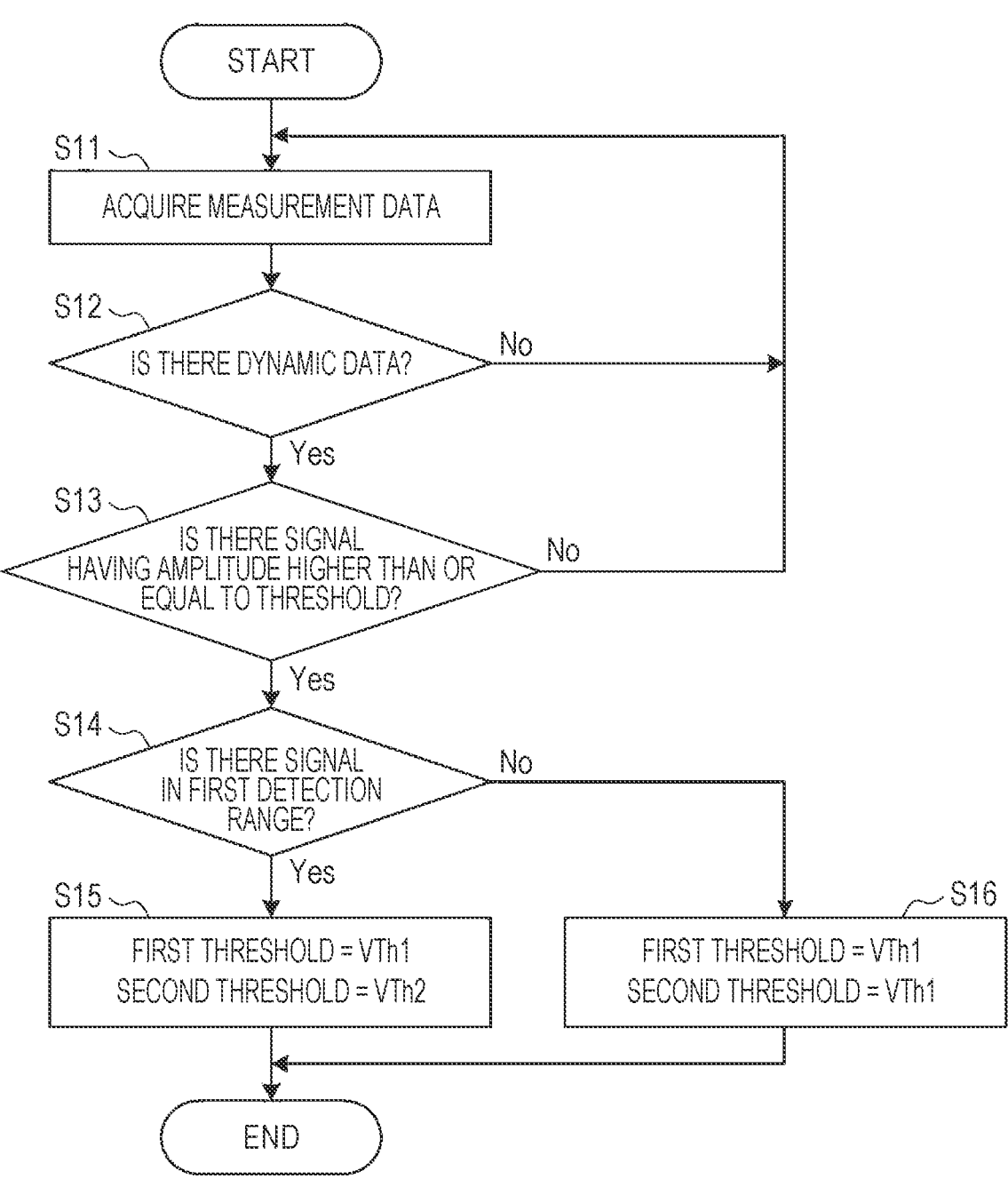
FIG. 26 is a flowchart illustrating processing performed by the detection device of this exemplary embodiment at the time of detecting a measurement target.

Processing performed by the detection device 20 of this exemplary embodiment at the time of detecting a measurement target will be described with reference to a flowchart in FIG. 26.

First, the controller 31 starts measurement and acquires measurement data in step S11.

In step S12, the controller 31 then determines whether there is dynamic data in the measurement data.

If the controller 31 determines that there is not dynamic data in step S12, the controller 31 returns to step S11 and performs the processing again from the measurement data acquisition.

If the controller 31 determines that there is dynamic data in step S12, the controller 31 determines in step S13 whether there is a signal having a value higher than or equal to a threshold in the dynamic data regarding the entire detection range of the detection device 20. The entire detection range is a range composed of the first detection range R1 and the second detection range R2.

If the controller 31 determines in step S13 that there is not a signal having a value higher than or equal to a threshold, the controller 31 returns to step S11 and performs the processing again from the measurement data acquisition.

If the controller 31 determines in step S13 that there is a signal having a value higher than or equal to a threshold, the controller 31 determines whether there is a signal in the first detection range R1 in step S14.

If the controller 31 determines that there is a signal in the first detection range R1 in step S14, the controller 31 sets the first threshold to the threshold VTh1 in step S15 and the second threshold to the threshold VTh2 higher than the threshold VTh1 as the first threshold.

If the controller 31 determines that there is not a signal in the first detection range R1 in step S14, the controller 31 sets the first threshold and the second threshold to the same threshold VTh1 in step S16.

Modification

The example in which the image forming apparatus 10 is equipped with the detection device 20 has heretofore been described for the aforementioned exemplary embodiment; however, the present disclosure is not limited to this case as described above. The present disclosure is likewise applicable to an information processing apparatus that is operated by a user approaching the information processing apparatus, such as an automatic teller machine (ATM) or a ticket machine, or an apparatus that detects an obstacle, such as a self-propelled automated guided vehicle or a vacuuming robot.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A detection device includes:

a sound wave sensor that detects a distance to a measurement target; and a processor configured to:

in response to the measurement target being detected in a first detection range that is part of a detection range in which the distance to the measurement target is detectable by the sound wave sensor, change setting to cause a detection sensitivity for a second detection range in the detection range of the sound wave sensor to be a second detection sensitivity lower than a first detection sensitivity set before the setting is changed, the second detection range being outward of the first detection range when viewed from the detection device.

(((2)))

In the detection device according to (((1))), the processor is configured to:

in response to the measurement target being detected in the first detection range and the detected measurement target moving away from the detection device, change the setting to change the detection sensitivity for the second detection range from the second detection sensitivity to the first detection sensitivity.

(((3)))

In the detection device according to (((2))), a third detection range that is a detection range as part of the first detection range and that is closest to the detection device is set, and the processor is configured to:

in response to the measurement target moving away from the detection device and being detected in the first detection range and outside the third detection range, change the setting to change the detection sensitivity for the second detection range from the second detection sensitivity to the first detection sensitivity; and in response to the measurement target moving away from the detection device but being detected in the third detection range, use, as a detected measurement target, the measurement target detected in the third detection range.

(((4)))

In the detection device according to (((3))), the processor is configured to:

in response to the detected measurement target in the third detection range being stationary, not consider the detected measurement target as a measurement target.

(((5)))

In the detection device according to any one of (((1))) to (((4))), the processor is configured to:

on the basis of comparison between an amplitude value of a signal in the first detection range detected by the sound wave sensor and a predetermined first threshold for a first detection range, detect presence of the measurement target in the first detection range; and on the basis of comparison between an amplitude value of a signal in the second detection range detected by the sound wave sensor and a predetermined second threshold for the second detection range, detect presence of the measurement target in the second detection range, before the measurement target is detected in the first detection range, the first threshold is identical to the second threshold, and the processor is configured to, in response to the measurement target being detected in the first detection range, set the second threshold to be higher than the first threshold.

(((6)))

In the detection device according to any one of (((1))) to (((5)))

the processor is configured to:

in response to the multiple measurement targets being detected in the first detection range and the second detection range, use, as a detected measurement target, a measurement target of the measurement targets that is detected in the first detection range.

(((7)))

In the detection device according to (((6))), the processor is configured to:

in response to a measurement target not being detected in the first detection range and the multiple measurement targets being detected in the second detection range, use, as a detected measurement target, a measurement target of the measurement targets that is approaching the detection device.

(((8)))

An image forming apparatus includes:

an image forming apparatus including the detection device according to any one of (((1))) to (((7))); and a controller that controls an operation state of the image forming apparatus by using a result of measurement target detection by the detection device.

(((9)))

A program causes a computer to execute a process including:

in response to a measurement target being detected in a first detection range that is part of a detection range in which the distance to the measurement target is detectable by a sound wave sensor that detects a distance to a measurement target, changing setting to cause a detection sensitivity for a second detection range in the detection range of the sound wave sensor to be a second detection sensitivity lower than a first detection sensitivity set before the setting is changed, the second detection range being outward of the first detection range when viewed from the sound wave sensor.

What is claimed is:

1. A detection device comprising:
a sensor that detects a distance to a measurement target; and
a processor configured to:
in response to the measurement target being detected in a first detection range that is part of a detection range in which the distance to the measurement target is detectable by the sensor, change setting to cause a detection sensitivity for a second detection range in the detection range of the sensor to be a second detection sensitivity lower than a first detection sensitivity set before the setting is changed, the second detection range being outward of the first detection range when viewed from the detection device, and
in response to the measurement target being detected in the first detection range and the measurement target detected moving away from the detection device, change the setting to change the detection sensitivity for the second detection range from the second detection sensitivity to the first detection sensitivity.

2. The detection device according to claim 1,
wherein a third detection range that is a detection range as part of the first detection range and that is closest to the detection device is set, and
wherein the processor is configured to:
in response to the measurement target moving away from the detection device and being detected in the first detection range and outside the third detection range, change the setting to change the detection sensitivity for the second detection range from the second detection sensitivity to the first detection sensitivity; and
in response to the measurement target moving away from the detection device but being detected in the third detection range, use, as a detected measurement target, the measurement target detected in the third detection range.

3. The detection device according to claim 2,
wherein the processor is configured to:
in response to the detected measurement target in the third detection range being stationary, not consider the detected measurement target as a measurement target.

4. An image forming apparatus comprising:
the detection device according to claim 3; and
a controller that controls an operation state of the image forming apparatus by using a result of measurement target detection by the detection device.

5. An image forming apparatus comprising:
the detection device according to claim 2; and
a controller that controls an operation state of the image forming apparatus by using a result of measurement target detection by the detection device.

6. The detection device according to claim 1,
wherein the processor is configured to:
on a basis of comparison between an amplitude value of a signal in the first detection range detected by the sensor and a predetermined first threshold for a first detection range, detect presence of the measurement target in the first detection range; and on a basis of comparison between an amplitude value of a signal in the second detection range detected by the sensor and a predetermined second threshold for the second detection range, detect presence of the measurement target in the second detection range,
wherein before the measurement target is detected in the first detection range, the first threshold is identical to the second threshold, and
wherein the processor is configured to, in response to the measurement target being detected in the first detection range, set the second threshold to be higher than the first threshold.

7. An image forming apparatus comprising:
the detection device according to claim 6; and
a controller that controls an operation state of the image forming apparatus by using a result of measurement target detection by the detection device.

8. The detection device according to claim 1,
wherein the processor is configured to:
in response to a plurality of the measurement targets being detected in the first detection range and the second detection range, use, as a detected measurement target, a measurement target of the measurement targets that is detected in the first detection range.

9. The detection device according to claim 8,
wherein the processor is configured to:
in response to a measurement target not being detected in the first detection range and the plurality of measurement targets being detected in the second detection range, use, as a detected measurement target, a measurement target of the measurement targets that is approaching the detection device.

10. An image forming apparatus comprising:
the detection device according to claim 9; and
a controller that controls an operation state of the image forming apparatus by using a result of measurement target detection by the detection device.

11. An image forming apparatus comprising:
the detection device according to claim 8; and
a controller that controls an operation state of the image forming apparatus by using a result of measurement target detection by the detection device.

12. An image forming apparatus comprising:
the detection device according to claim 1; and
a controller that controls an operation state of the image forming apparatus by using a result of measurement target detection by the detection device.

13. A non-transitory computer readable medium storing a program causing a computer to execute a process comprising:
in response to a measurement target being detected in a first detection range that is part of a detection range in which the distance to the measurement target is detectable by a sensor that detects a distance to a measurement target, changing setting to cause a detection sensitivity for a second detection range in the detection range of the sensor to be a second detection sensitivity lower than a first detection sensitivity set before the setting is changed, the second detection range being outward of the first detection range when viewed from the sensor, and
in response to the measurement target being detected in the first detection range and the detected measurement target moving away from the sensor, changing the setting to change the detection sensitivity for the second detection range from the second detection sensitivity to the first detection sensitivity.

14. A detection method comprising:

in response to a measurement target being detected in a first detection range that is part of a detection range in which the distance to the measurement target is detectable by a sensor that detects a distance to a measurement target, changing setting to cause a detection sensitivity for a second detection range in the detection range of the sensor to be a second detection sensitivity lower than a first detection sensitivity set before the setting is changed, the second detection range being outward of the first detection range when viewed from the sensor, and in response to the measurement target being detected in the first detection range and the detected measurement target moving away from the sensor, changing the setting to change the detection sensitivity for the second detection range from the second detection sensitivity to the first detection sensitivity.

* * * * *